United States Patent
Rahman et al.

(10) Patent No.: US 11,546,902 B2
(45) Date of Patent: Jan. 3, 2023

(54) METHOD AND APPARATUS FOR DYNAMIC MULTI-BEAM OPERATIONS

(71) Applicant: Samsung Electronics Co., Ltd., Suwon-si (KR)

(72) Inventors: Md. Saifur Rahman, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 17/222,592

(22) Filed: Apr. 5, 2021

(65) Prior Publication Data

US 2021/0321378 A1    Oct. 14, 2021

Related U.S. Application Data

(60) Provisional application No. 63/158,615, filed on Mar. 9, 2021, provisional application No. 63/009,234, filed on Apr. 13, 2020.

(51) Int. Cl.
*H04W 72/04* (2009.01)

(52) U.S. Cl.
CPC ....... *H04W 72/044* (2013.01); *H04W 72/048* (2013.01); *H04W 72/0413* (2013.01)

(58) Field of Classification Search
CPC ........... H04W 72/044; H04W 72/0413; H04W 72/048; H04B 7/0404; H04B 7/0695
See application file for complete search history.

(56) References Cited

U.S. PATENT DOCUMENTS

| | | | |
|---|---|---|---|
| 10,588,137 B2 | 3/2020 | Zhang et al. | |
| 2017/0201304 A1 | 7/2017 | Kim | |
| 2019/0215701 A1* | 7/2019 | Honglei | H04W 24/02 |
| 2019/0253220 A1* | 8/2019 | Kim | H04L 5/0044 |
| 2019/0260456 A1 | 8/2019 | Zhou et al. | |
| 2019/0335441 A1* | 10/2019 | Bai | H04B 7/088 |
| 2021/0258964 A1* | 8/2021 | Khoshnevisan | H04B 7/0695 |
| 2021/0320699 A1* | 10/2021 | Zhou | H04B 7/0695 |

FOREIGN PATENT DOCUMENTS

KR    10-2019-0098695 A    8/2019

OTHER PUBLICATIONS

NPL (EP3930274 A1, published on Feb. 22, 2019) discloses a user terminal and wireless communication method. (Year: 2019).*
NPL (WO/2020/064878 A1, published on Apr. 2, 2020) discloses a beamforming assistance method. (Year: 2020).*

(Continued)

*Primary Examiner* — Siu M Lee

(57) ABSTRACT

A method for operating a user equipment (UE) comprises receiving configuration information including P>1 beam switching time (BST) values and a set of TCI states; receiving, based on the configuration information, a transmission configuration indicator (TCI) state update; determining a beam based on the TCI state update; and applying the beam for a downlink (DL) reception or an uplink (UL) transmission, at least after a duration of time from receiving the TCI state update, wherein the duration of time is determined based on the P BST values.

20 Claims, 21 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.
"LTE; Evolved Universal Terrestrial Radio Access (E-UTRA); Physical layer procedures (3GPP TS 36.213 version 16.4 0 Release 16)", ETSI TS 136 213 V16.4.0, Feb. 2021, 577 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.
"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.
"3rd Generation Partnership Project; Technical Specification Group Radio Access Network; NR; Physical channels and modulation (Release 16)", 3GPP TS 38.211 V16.4.0, Dec. 2020, 133 pgs.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"3rd Generation Partnership Project; Technical Specification Group Radio Access Network; NR; Physical layer measurements (Release 16)", 3GPP TS 38.215 V16.1.0, Mar. 2020, 22 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion of the International Searching Authority dated Jul. 20, 2021 in connection with International Application No. PCT/KR2021/004647, 10 pages.
Intel Corporation, "UE features for NR TEI," R1-2002025, 3GPP TSG RAN WG1 #100bis, e-Meeting, Apr. 20-30, 2020, 4 pages.

\* cited by examiner

METHOD AND APPARATUS FOR DYNAMIC MULTI-BEAM OPERATIONS

CROSS-REFERENCE TO RELATED APPLICATIONS AND CLAIM OF PRIORITY

The present application claims priority to U.S. Provisional Patent Application No. 63/009,234, filed on Apr. 13, 2020, and U.S. Provisional Patent Application No. 63/158,615 filed on Mar. 9, 2021. The content of the above-identified patent documents is incorporated herein by reference.

TECHNICAL FIELD

The present disclosure relates generally to wireless communication systems and more specifically to methods for enabling dynamic multi-beam operations.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beamformed systems, a beam indication mechanism is needed in order to align the spatial beams at both gNB and UE.

SUMMARY

Embodiments of the present disclosure provide methods and apparatuses to enable dynamic multi-beam operations in a wireless communication system.

In one embodiment, a UE in a wireless communication system is provided. The UE includes a transceiver configured to receive configuration information including P>1 beam switching time (BST) values and a set of TCI states; and receive, based on the configuration information, a transmission configuration indicator (TCI) state update. The UE further includes a processor operably coupled to the transceiver. The processor is configured to determine a beam based on the TCI state update; and apply the beam for a downlink (DL) reception or an uplink (UL) transmission, at least after a duration of time from receiving the TCI state update, wherein the duration of time is determined based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update.

In another embodiment, a BS in a wireless communication system is provided. The BS includes a processor configured to generate configuration information including P>1 beam switching time (BST) values and a set of TCI states, and generate, based on the configuration information, a transmission configuration indicator (TCI) state update. The BS further includes a transceiver operably coupled to the processor. The transceiver is configured to: transmit the configuration information, transmit, based on the configuration information, the TCI state update indicating a beam and transmit a downlink (DL) transmission for reception by a user equipment (UE) or receive an uplink (UL) transmission transmitted by the UE, where the DL reception or the UL transmission is via the beam that is applied by the UE at least after a duration of time from receiving the TCI state update, wherein the duration of time is indicated based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update.

In yet another embodiment, a method for operating a UE is provided. The method comprises: receiving configuration information including P>1 beam switching time (BST) values and a set of TCI states; receiving, based on the configuration information, a transmission configuration indicator (TCI) state update; determining a beam based on the TCI state update; and applying the beam for a downlink (DL) reception or an uplink (UL) transmission, at least after a duration of time from receiving the TCI state update, wherein the duration of time is determined based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
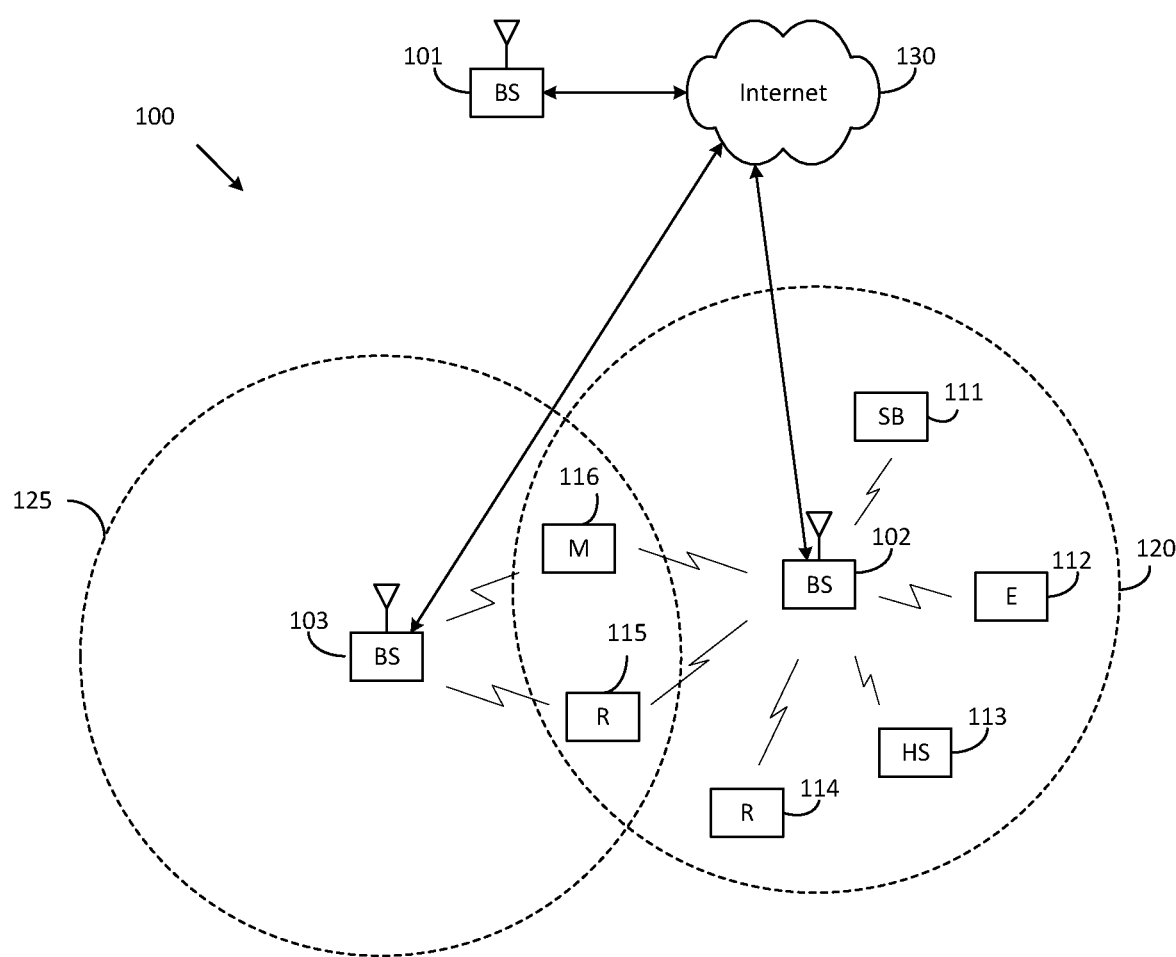
FIG. 1 illustrates an example wireless network according to embodiments of the present disclosure.

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.4.0, "E-UTRA, Physical channels and modulation" (herein "REF 1"); 3GPP TS 36.212 v16.4.0, "E-UTRA, Multiplexing and Channel coding" (herein "REF 2"); 3GPP TS 36.213 v16.4.0, "E-UTRA, Physical Layer Procedures" (herein "REF 3"); 3GPP TS 36.321 v16.3.0, "E-UTRA, Medium Access Control (MAC) protocol specification" (herein "REF 4"); 3GPP TS 36.331 v16.3.0, "E-UTRA, Radio Resource Control (RRC) protocol specification" (herein "REF 5"); 3GPP TS 38.211 v16.4.0, "NR, Physical channels and modulation" (herein "REF 6"); 3GPP TS 38.212 v16.1.0, "NR, Multiplexing and Channel coding" (herein "REF 7"); 3GPP TS 38.213 v16.1.0, "NR, Physical Layer Procedures for Control" (herein "REF 8"); 3GPP TS 38.214 v16.1.0, "NR, Physical Layer Procedures for Data" (herein "REF 9"); 3GPP TS 38.215 v16.1.0, "NR, Physical Layer Measurements" (herein "REF 10"); 3GPP TS 38.321 v16.1.0, "NR, Medium Access Control (MAC) protocol specification"

(herein "REF 11"); and 3GPP TS 38.331 v16.1.0, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
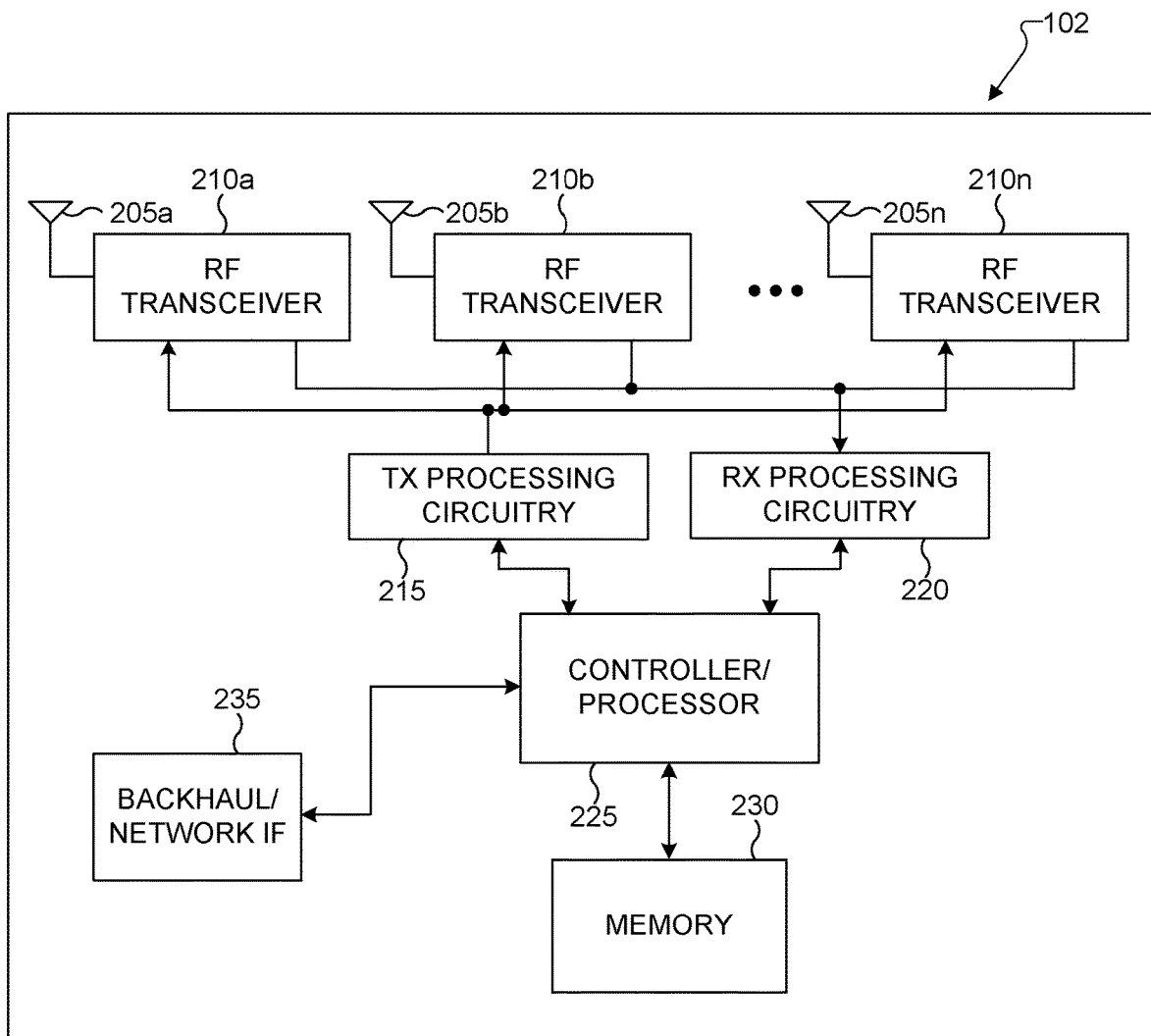
FIG. 2 illustrates an example gNB according to embodiments of the present disclosure.
Figure 3:
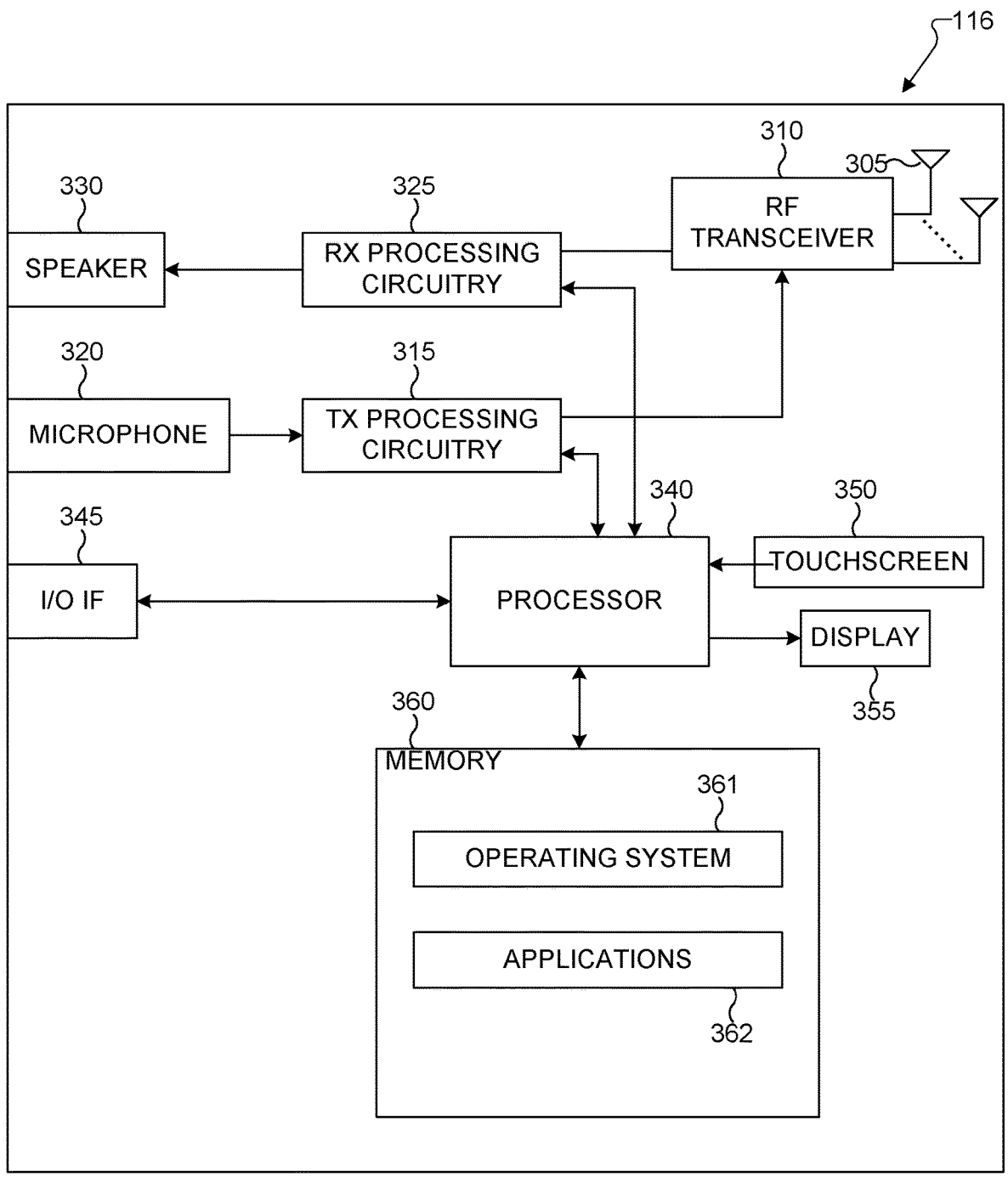
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information including P>1 beam switching time (BST) values and a set of TCI states; receiving, based on the configuration information, a transmission configuration indicator (TCI) state update; determining a beam based on the TCI state update; and applying the beam for a downlink (DL) reception or an uplink (UL) transmission, at least after a duration of time from receiving the TCI state update, wherein the duration of time is determined based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update. One or more of the gNBs 101-103 includes circuitry, programing, or a combination thereof, for generating configuration information including P>1 beam switching time (BST) values and a set of TCI states; generating, based on the configuration information, a transmission configuration indicator (TCI) state update; transmitting the configuration information; transmitting, based on the configuration information, the TCI state update indicating a beam; and transmitting a downlink (DL) transmission for reception by a user equipment (UE) or receive an uplink (UL) transmission transmitted by the UE, where the DL reception or the UL transmission is via the beam that is applied by the UE at least after a duration of time from receiving the TCI state update, wherein the duration of time is indicated based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information including P>1 beam switching time (BST) values and a set of TCI states; receiving, based on the configuration information, a transmission configuration indicator (TCI) state update; determining a beam based on the TCI state update; and applying the beam for a downlink (DL) reception or an uplink (UL) transmission, at least after a duration of time from receiving the TCI state update, wherein the duration of time is determined based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
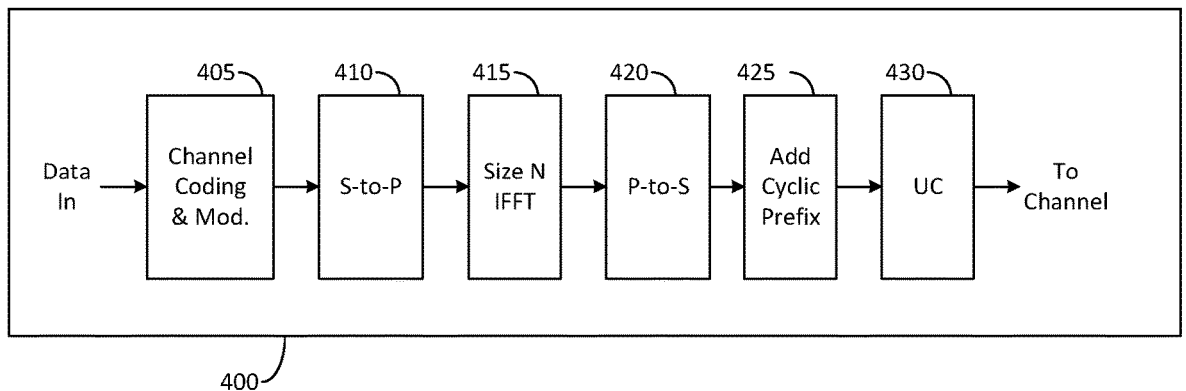
FIG. 4A illustrates a high-level diagram of an orthogonal frequency division multiple access transmit path according to embodiments of the present disclosure.
Figure 4B:
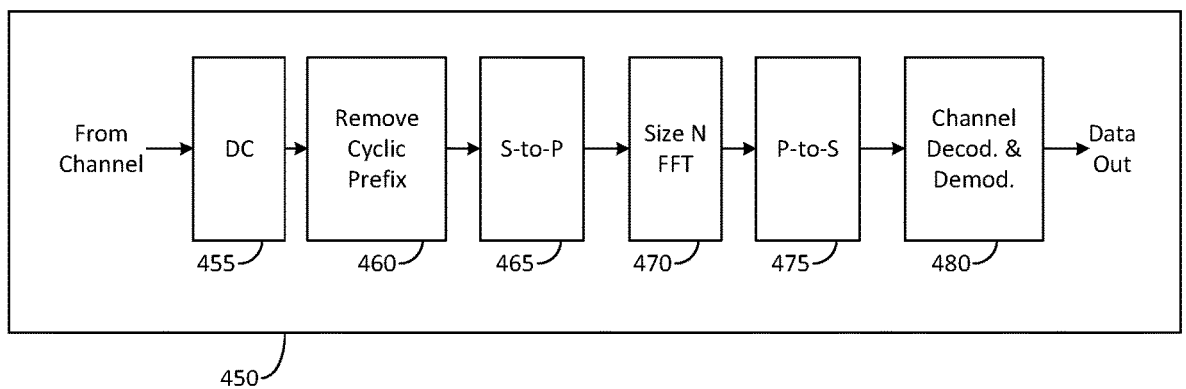
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s=(n_{s0}+y-N_{EPDCCH})$ mod D RBs for a total of $Z=O_F+\lfloor(n_{s0}+y\cdot N_{EPDCCH})/D\rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB}\cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2-(N_{symb}^{UL}-1)-N_{SRS}$, where $N_{SRS}=1$ if a last subframe symbol is used to transmit SRS and $N_{SRS}=0$ otherwise.

Figure 5:
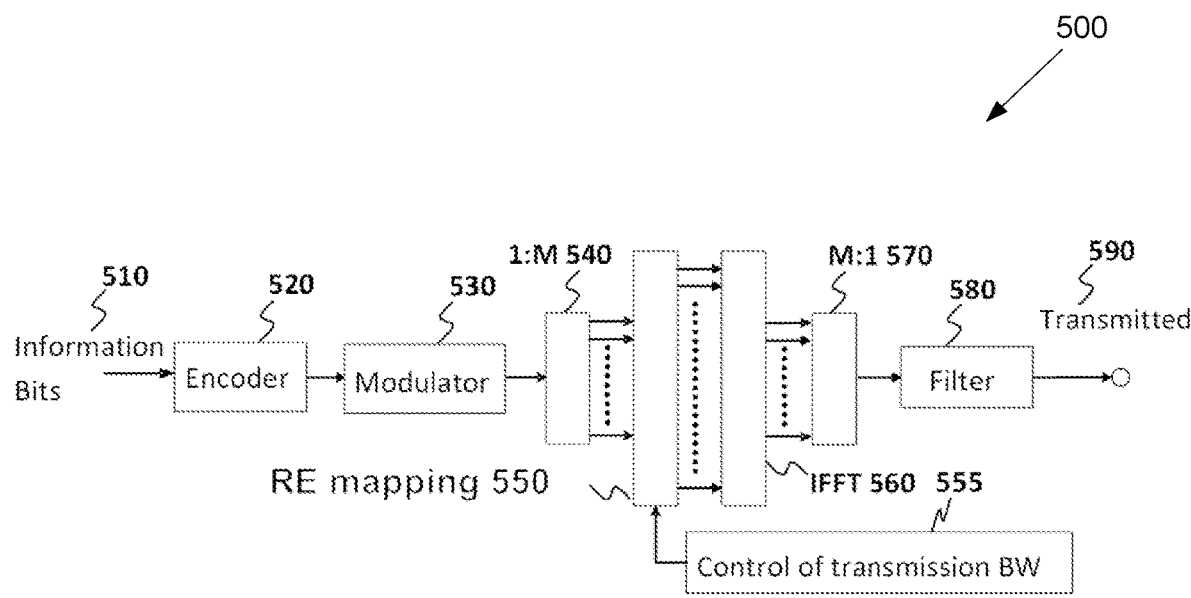
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
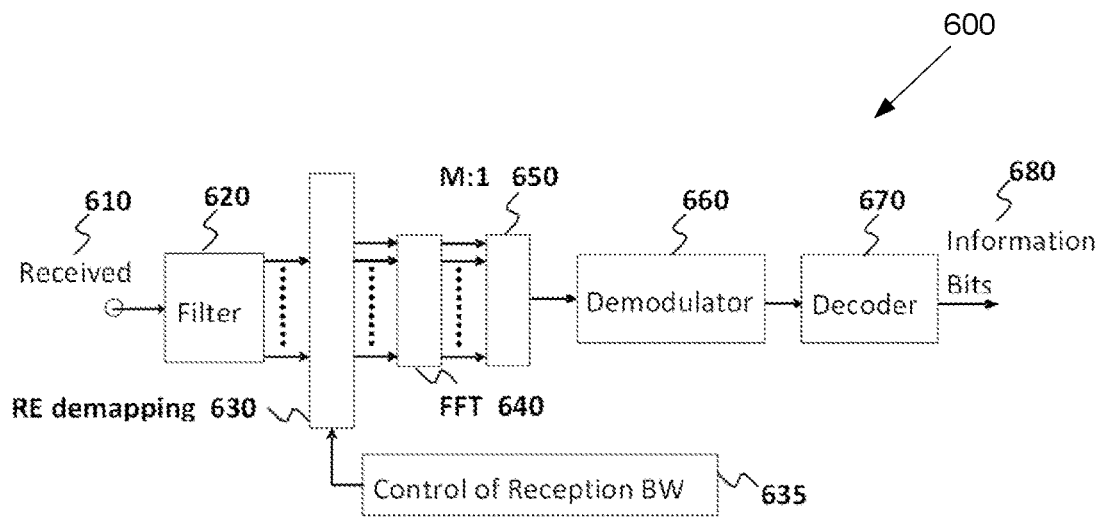
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
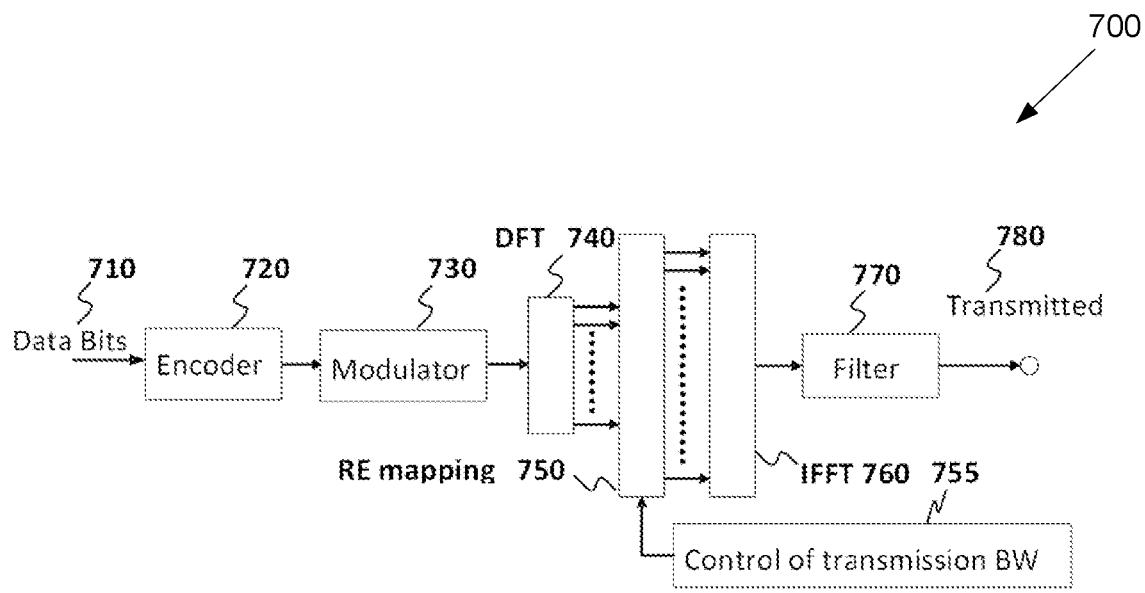
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
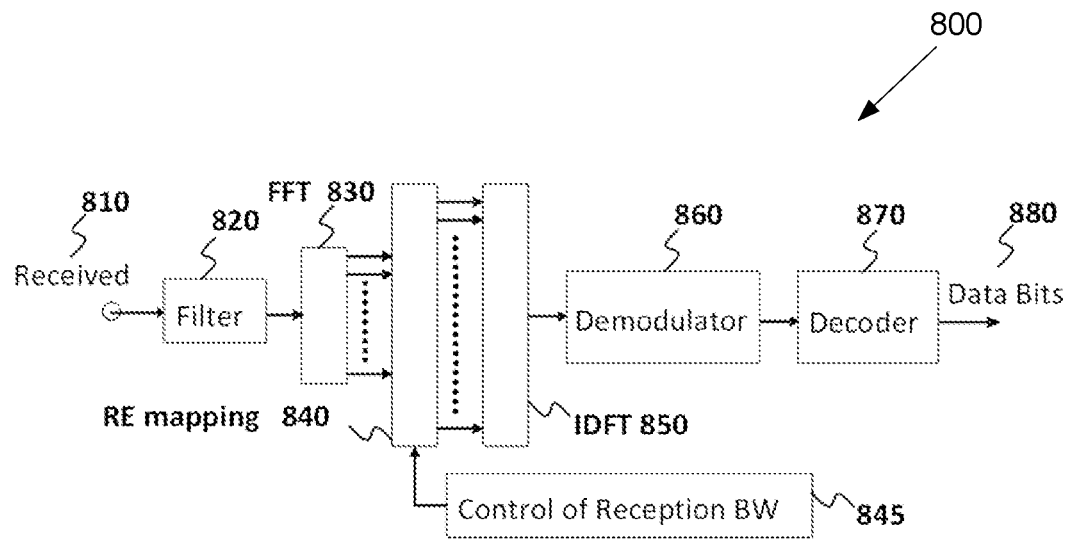
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one scheme has been identified in 3GPP specification, called network slicing.

To utilize PHY resources efficiently and multiplex various slices (with different resource allocation schemes, numerologies, and scheduling strategies) in DL-SCH, a flexible and self-contained frame or subframe design is utilized.

Figure 9:
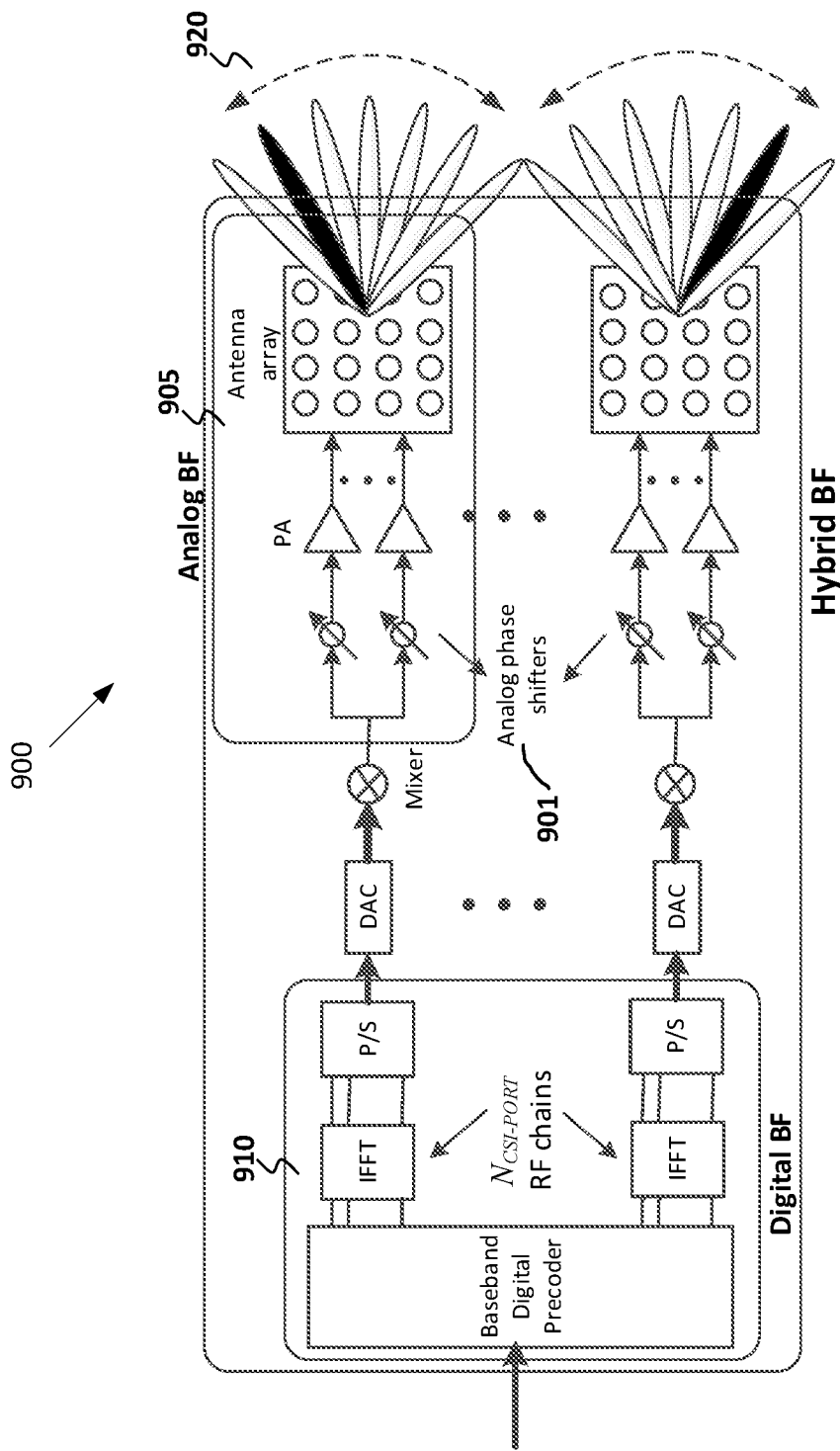
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the multiplexing of two slices 900.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

In 3GPP LTE and NR (new radio access or interface), network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 9) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 9), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e., inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In this case, high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Therefore, there is a need for an access, radio resource, and mobility management framework which facilitates seamless access by reducing the amount of higher layer procedures. In addition, there is also a need for a streamlined MIMO design that facilitates high capacity MIMO transmission.

In the 3GPP NR specification, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In the 3GPP NR specification, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, the 3GPP NR specification beam management becomes cumbersome and is unlikely able to keep up with more aggressive use cases which require large number of beams and fast beam switching (e.g., higher frequency bands, high mobility, and/or larger number of narrower analog beams). In addition, the 3GPP NR specification was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In the 3GPP NR specification, the handover procedure to handle inter-cell mobility, similar to LTE, and relies heavily on RRC (and even higher layer) reconfigurations to update cell-specific parameters. Such reconfigurations usually are slow and incur large latency (up to several milliseconds). For high mobility UEs, this issue gets worse due to the need for more frequency handovers, hence more frequency RRC reconfigurations.

For high mobility UEs in FR2, the two latency issues mentioned above, one with the hierarchical NW structure (with visible cell boundaries) and the other with the beam management, compound together and make the latency issue much worse, and lead to frequent radio link failures (RLFs). Therefore, there is a need for solutions/mechanisms which can reduce RLFs for high mobility UEs in FR2.

One such solution/mechanism is based on a unified TCI state (beam indication) framework wherein a common beam (or TCI state) is used for (associated with) the transmission/reception of both data (PDSCH/PUSCH) and control (PDCCH/PUCCH), and also for DL and UL (for example, when beam correspondence holds between DL and UL). In this common beam (or TCI state) based multi-beam operation, the common beam (TCI state) indication/update has to happen prior to (separately from) the transmission/reception of the control information (e.g., DL/UL-related DCI in PDCCH) scheduling a DL assignment for DL data (PDSCH) or an UL grant for UL data (PUSCH). Note that a common beam based multi-beam operation is supported in the 3GPP NR specification beam management, wherein a common beam for DL data (PDSCH) and control (PDCCH) is indicated via a MAC CE based signaling (when the higher layer parameter tci-PresentInDCI in PDSCH-Config is not 'enabled'). Such MAC-CE based common beam activation, however, is too sluggish due to the reasons explained above.

Since the TCI state for the data beam is updated in a time slot (or subframe) prior to the slot (or subframe) carrying the DCI scheduling the DL assignment or the UL grant, there might be some performance loss when compared with the case when the TCI state update for the data beam is performed together with the DL assignment or the UL grant. This issue can be much worse for high mobility UEs which require frequent/accurate update of data beam for seamless data transmission/reception. In this disclosure, several embodiments and examples are provided to address this issue.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assigned represented by a TCI state, the UE applies the known characteristics of the reference RS to the assigned DL transmission. The reference RS can be received and measured by the UE (in this case, the reference RS is a downlink signal such as NZP CSI-RS and/or SSB) with the result of the measurement used for calculating a beam report (in the 3GPP NR specification, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
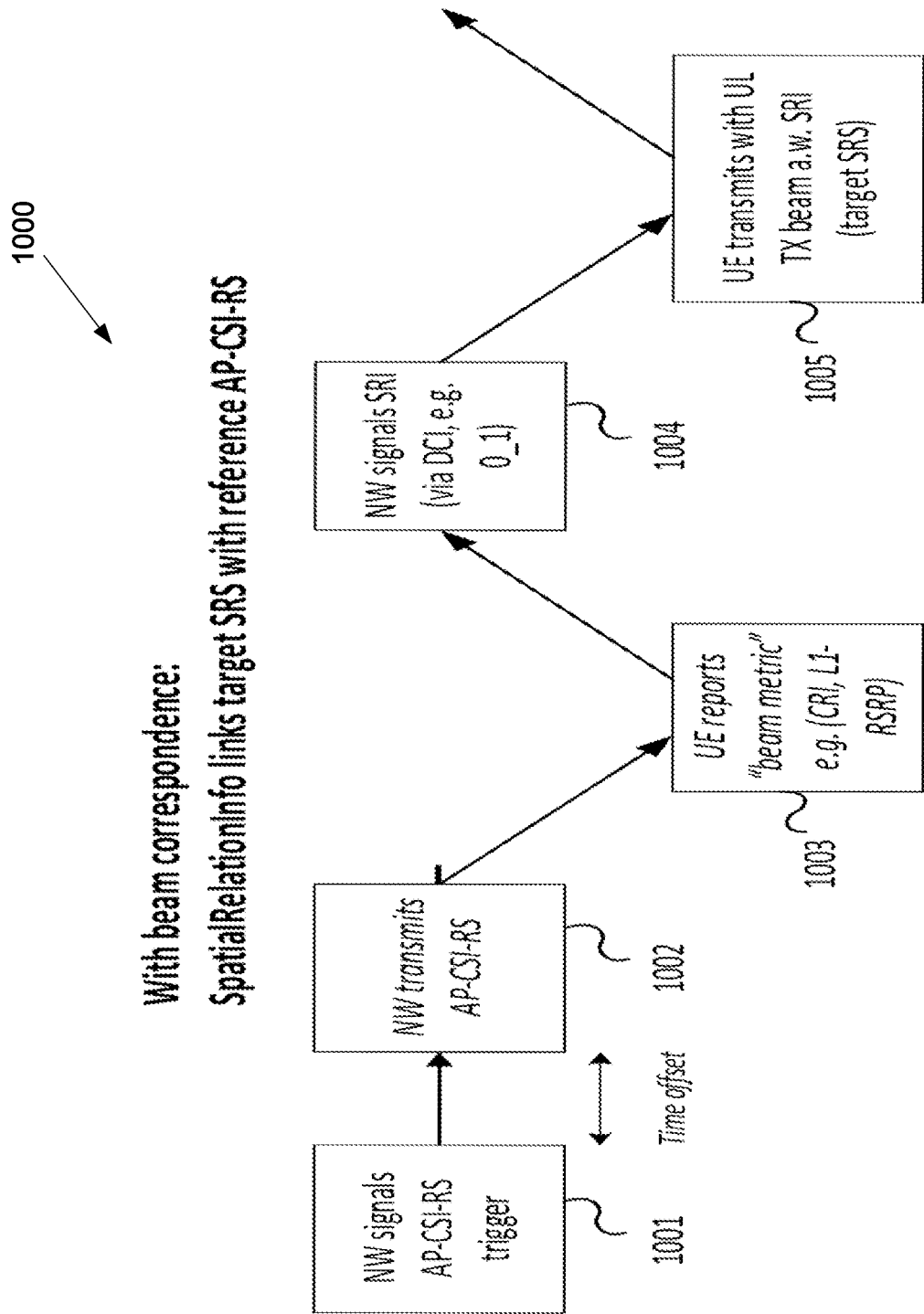
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 01 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
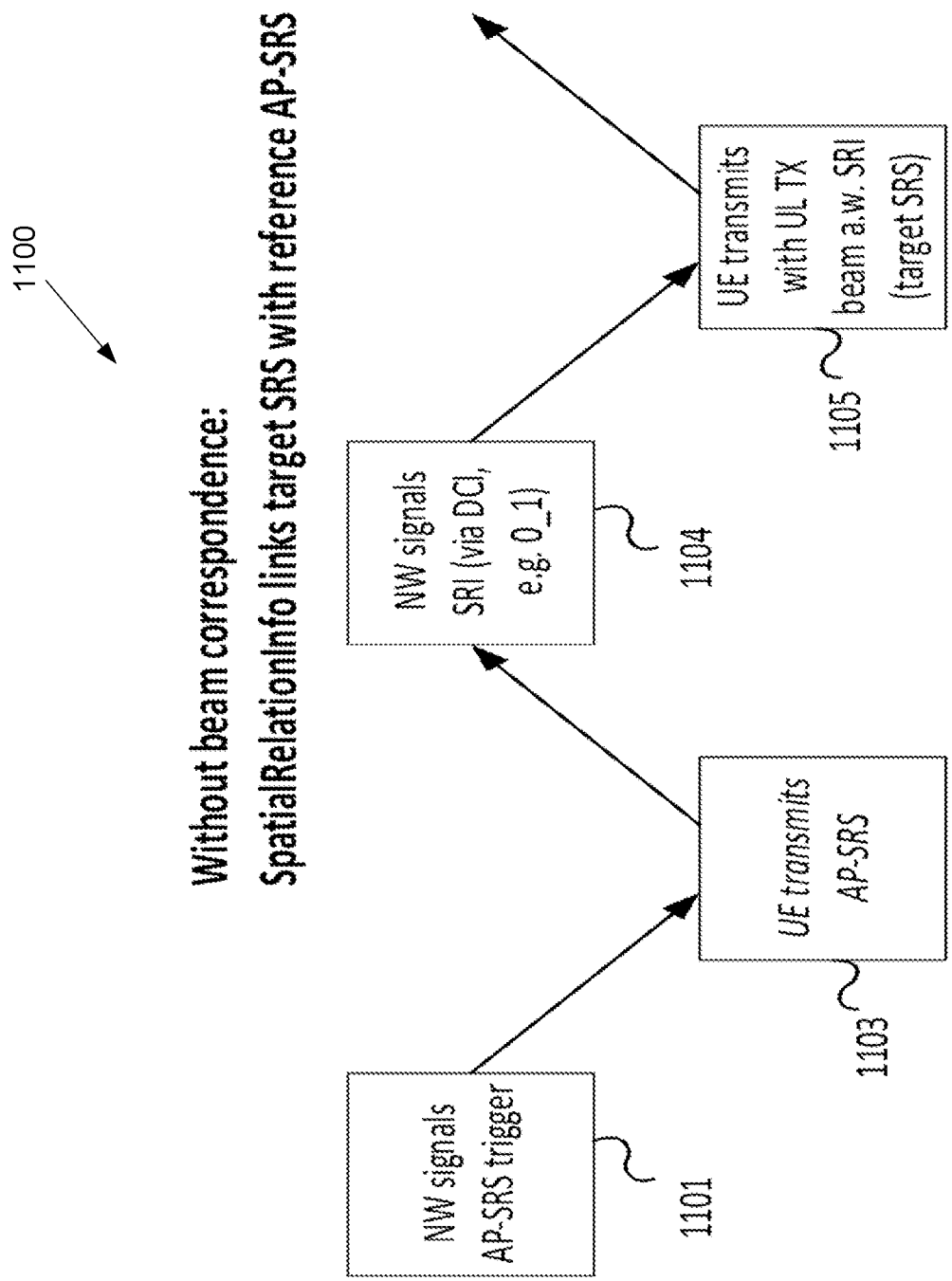
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1105).

Figure 12:
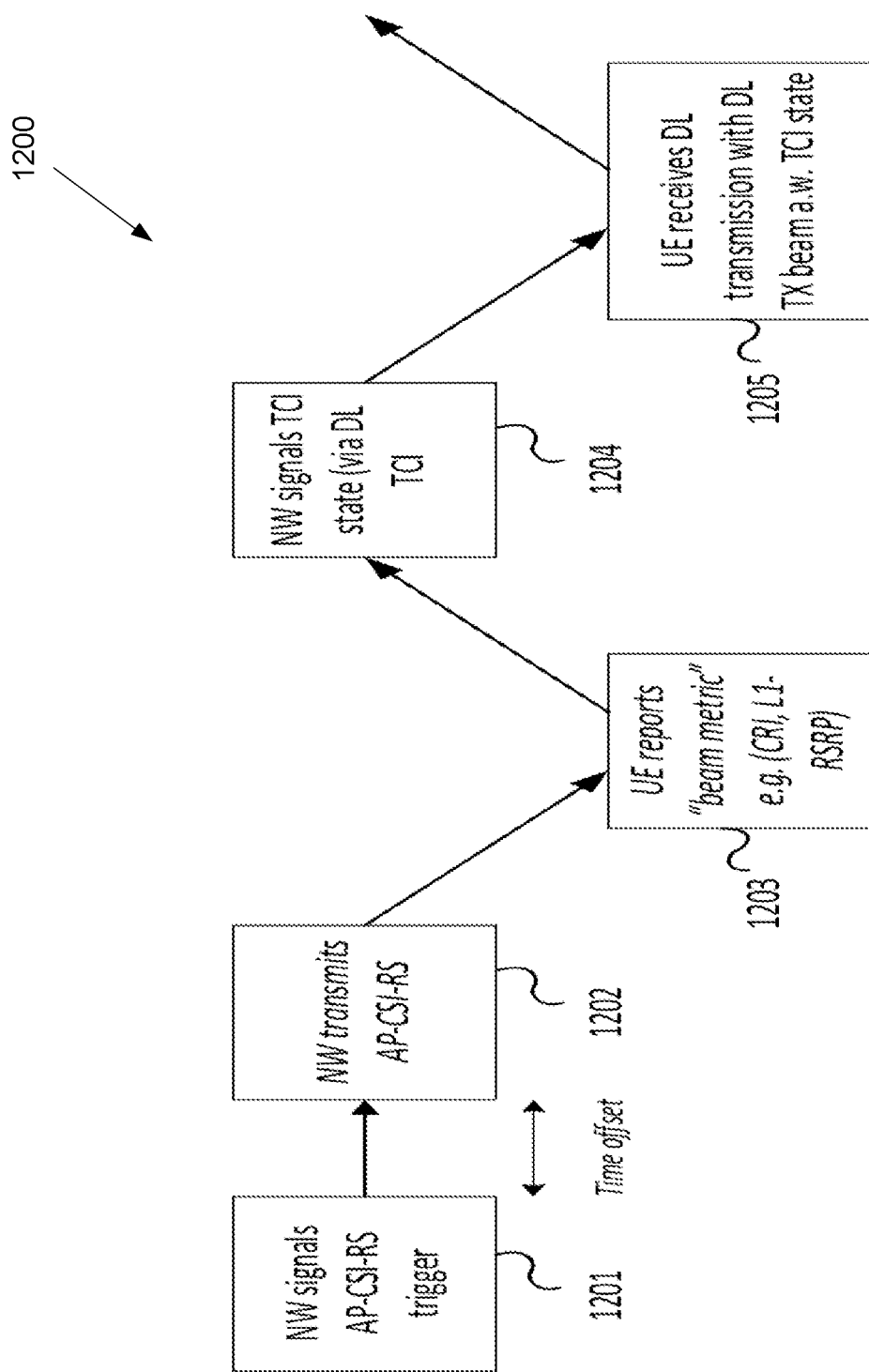
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in the 3GPP NR specification) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

To facilitate fast beam management, one requirement is to streamline the foundational components (building blocks) for beam management. One functionality of beam management is beam selection which comprises functions such as beam measurement (including training), reporting (for DL beam management, reporting via UL control channel(s)), and indication (for DL and UL beam management, indication via DL control channel(s)). Once the building blocks are streamlined [step 1], additional advanced features to facilitate faster beam management can be added [step 2].

In U.S. patent application Ser. No. 16/949,246 filed on Oct. 21, 2020, the disclosure of which is incorporated by reference herein, a "slim mode" with streamlined designs of such foundational components [step 1] is proposed for fast beam management. The slim-mode design, due to its compact nature, can facilitate faster update/reconfiguration via lower-layer control signaling. In other words, L1 control signaling will be the primary signaling mechanism and higher-layer (such as MAC CE or RRC) is used only when necessary. Here, L1 control signaling includes the use of UE-group DCI as well as dedicated (UE-specific) DCI.

The aforementioned additional advanced features can include extensions of beam management (multi-beam operation) from intra-cell to inter-cell mobility. With such mechanism, seamless access/mobility for RRC_CONNECTED UEs—as if cell boundaries were not observed unless a UE is in initial access or initial-access-like condition—can be achieved. Another advanced feature includes mechanisms to minimize beam failure (BF) or radio link failure (RLF) such as low-overhead faster beam switching/selection and UE-initiated/event-triggered beam management. With such preventive mechanisms in place, beam failure recovery (BFR) will be less likely used.

In this disclosure, signaling mechanisms for enabling the above-mentioned fast (dynamic) multi-beam operations are considered. In particular, a common beam (TCI state) indication via a separate DCI is considered in which in the indicated beam is common for both data and control (as explained above).

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space.

In a beam-formed wireless system, the transmission and reception of wireless signal can be via multiple TX and multiple RX beams.

In this disclosure, a dynamic, L1-control or DCI based, common beam indication mechanisms are considered. For illustration, the following notation/terminology is used in this disclosure. Other terminology can also be used to represent the same functions and operations:

- a DCI indicating a common beam for data (PDSCH/PUSCH) and control (PDCCH/PUCCH) for both DL and UL is referred to as TCI-DCI (e.g., used when beam correspondence holds between DL and UL),
- a DCI indicating a common beam for data (PDSCH) and control (PDCCH) for DL is referred to as DL-TCI-DCI,
- a DCI indicating a common beam for data (PUSCH) and control (PUCCH) for UL is referred to as UL-TCI-DCI,
- a DCI scheduling a DL assignment is referred to as DL-DCI, and
- a DCI scheduling a UL grant is referred to as UL-DCI.

In some embodiments of this disclosure, a beam for DL reception refers to a reference/source RS with a QCL information with QCL-type=TypeD, and a beam for UL transmission refers to a spatial relation information (e.g., associated with a reference/source RS).

In some embodiments of this disclosure, DL-TCI-DCI (that includes common beam or TCI state) is a new DCI format that is different from DL-DCI format (e.g., DCI format 1_0, 1_1 and 1_2 in Rel. 15 NR specification). Optionally, DL-TCI-DCI (that includes common beam or TCI state) is one of the DL-DCI formats (e.g., DCI format 1_0, 1_1 and 1_2 in Rel. 15 NR specification). Optionally, DL-TCI-DCI (that includes common beam or TCI state) can be a new DCI format or one of the DL-DCI formats (e.g., DCI format 1_1 and 1_2 in Rel. 15 NR specification), wherein the information whether it is a new format, or an existing format can be configured (e.g., via RRC). In an example, whether the DL-TCI-DCI can be a new TCI format is subject to a UE capability (reported by the UE), i.e., only when the UE reports that it is capable of receiving a new DCI format, the DL-TCI-DCI can be the new DCI format; otherwise it is an existing DCI format.

Likewise, in some embodiments of this disclosure, UL-TCI-DCI (that includes common beam or TCI state) is a new DCI format that is different from UL-DCI format (e.g., DCI format 0_0, 0_1 and 0_2 in Rel. 15 NR specification). Optionally, UL-TCI-DCI (that includes common beam or TCI state) is one of the UL-DCI formats (e.g., DCI format 0_0, 0_1 and 0_2 in Rel. 15 NR specification). Optionally, UL-TCI-DCI (that includes common beam or TCI state) can be a new DCI format or one of the DL-DCI formats (e.g., DCI format 0_0, 0_1 and 0_2 in Rel. 15 NR specification), wherein the information whether it is a new format, or an existing format can be configured (e.g., via RRC). In an example, whether the UL-TCI-DCI can be a new TCI format is subject to a UE capability (reported by the UE), i.e., only when the UE reports that it is capable of receiving a new DCI format, the UL-TCI-DCI can be the new DCI format; otherwise it is an existing DCI format.

In some embodiments of this disclosure, TCI-DCI (that includes common beam or TCI state) is a new DCI format that is different from a DL- or UL-DCI format (e.g., DCI format 0_0, 0_1, 0_2, 1_0, 1_1 and 1_2 in Rel. 15 NR specification). Optionally, TCI-DCI (that includes common beam or TCI state) is one of the DL- or UL-DCI formats (e.g., DCI format 0_0, 0_1, 0_2, 1_0, 1_1 and 1_2 in Rel. 15 NR specification). Optionally, TCI-DCI (that includes common beam or TCI state) can be a new DCI format or one of the DL- or UL-DCI formats (e.g., DCI format 0_0, 0_1, 0_2, 1_0, 1_1 and 1_2 in Rel. 15 NR specification), wherein the information whether it is a new format, or an existing format can be configured (e.g., via RRC). In an example, whether the TCI-DCI can be a new TCI format is subject to a UE capability (reported by the UE), i.e., only when the UE reports that it is capable of receiving a new DCI format, the TCI-DCI can be the new DCI format; otherwise it is an existing DCI format.

Figure 13:
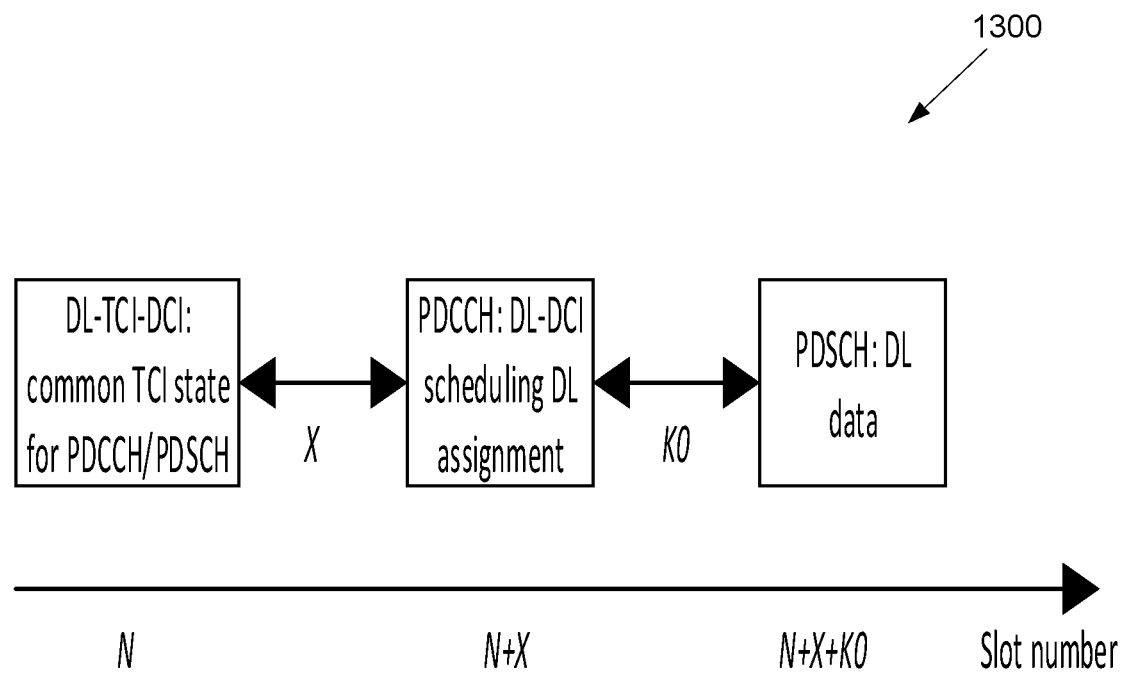
FIG. 13 illustrates an example of a dedicated DCI indicating the common beam for the reception of DL control and data according to embodiments of the present disclosure.

An example of a dedicated DCI indicating the common beam for the reception of DL control and data 1300 is illustrated in FIG. 13. The embodiment of the dedicated DCI indicating the common beam for the reception of DL control and data 1300 illustrated in FIG. 13 is for illustration only. FIG. 13 does not limit the scope of this disclosure to any particular implementation of the example of a dedicated DCI indicating the common beam for the reception of DL control and data 1300.

In embodiment I.1, as shown in FIG. 13, a UE is configured to receive a dedicated DCI (DL-TCI-DCI) indicating the common beam (TCI state) for the reception of DL control (PDCCH) and data (PDSCH). The UE receives (e.g., a DL-TCI-DCI format) and decodes DL-TCI-DCI in slot (or subframe) N, and uses the indicated beam (TCI state) to receive DL control (PDCCH) starting in the same (slot N) or later slot(s). For illustration, let X be the gap (in number of slots/subframes) between the slot carrying the DL-TCI-DCI and the slot carrying the DL control, then the UE receives DL control starting in slot N+X. The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot $N+X+K_0$. Here, the value of X can be fixed. Alternatively, the value of X can be selected from a set of values. Optionally, the value of X is not configured or set in a particular manner due to the aperiodic nature of the DCI signaling (DL-TCI-DCI and/or DL-DCI). That is, the time unit location (e.g., slot, subframe) used to signal the DL-TCI-DCI can be different from that used to signal the DL-DCI. In some examples, X can also be referred to as a downlink beam application time (DL-BAT) value B. In some example, X is lower bounded by B, i.e., X≥B.

In an example, the unit of N and/or X and/or/$K_0$ is defined in terms of number of OFDM symbols. The value X is measured from the end of DL-TCI-DCI decoding (i.e., the last symbol carrying DL-TCI-DCI) and the start of DL-DCI reception (i.e., the first symbol carrying DL-DCI), or the value X is determined as the first slot that is at least P ms or Q symbols after the DL-TCI-DCI with the common beam indication, where P or Q can be fixed, or configured, or determined/configured based on UE capability reporting). Likewise, the value $K_0$ is measured from the end of DL-DCI decoding (i.e., the last symbol carrying DL-DCI) and the start of PDSCH reception (i.e., the first symbol carrying PDSCH). In the rest of the disclosure, the unit of N, X, and $K_0$ is assumed to be in terms of time slots (so subframes). The embodiments of the disclosure, however, are general and are applicable to any units such as number of OFDM symbols.

In an example, the value of X is set/determined based on the UE's processing restriction (i.e., the processing latency) or capability. When a new beam (TCI state) is indicated via DL-TCI-DCI, it can be used for the reception of DL-DCI not earlier than X time (slots or subframes or OFDM symbols).

In one example, a UE is configured/triggered with a PUCCH transmission (e.g., for the HARQ-ACK feedback) that can be associated with a DL (e.g., PDSCH) reception, which is triggered (or scheduled) by DL-DCI. In this case, the TCI state (beam) for the PUCCH transmission is indicated/updated via either UL-TCI-DCI (cf. embodiment I.4 through I.6 below) or DL-TCI-DCI. The time gap between the DL-TCI-DCI/UL-TCI-DCI reception and the PUCCH transmission can be $N+X+K_0+J$, where J is the time gap (number of slots or subframes or OFDM symbols) between PDSCH reception and PUCCH transmission, and J can be fixed or configured from a set of candidate values.

When the PDCCH carrying the DL-TCI-DCI is associated with (configured) with a HARQ-ACK (or ACK/NACK) feedback (e.g., via a PUCCH transmission) indicating that the UE receives the updated common beam, then the beam application time may include the time between the PDCCH reception (either from the start or the end of PDCCH reception) and the corresponding PUCCH transmission (either from the start or the end of PUCCH transmission), i.e., $X=Y_1+Y_2$ where $Y_1$=the time between PDCCH reception and PUCCH transmission, and $Y_2$=the time between PUCCH transmission and DL-DCI reception. Alternatively, the beam application time equals $Y_2$. In this case, the TCI state (beam) for the PUCCH transmission can be the latest (previously) beam that is indicated via DL-TCI-DCI prior to the new/updated TCI state in the current slot.

The beam (or TCI state) to receive DL-TCI-DCI in slot N can be the beam (or TCI state) indicated via the latest DL-TCI-DCI in an earlier slot M<N. If the latest DL-TCI-DCI is not received or is not configured, then a default beam can be used. For instance, the default beam for PDCCH reception in the 3GPP NR specification can be used. Alternatively, the beam (or TCI state) to receive DL-TCI-DCI can be the beam to receive a DL channel and/or DL RS in an earlier slot M<N. Alternatively, the beam (or TCI state) to receive DL-TCI-DCI can be associated with the beam to transmit a UL channel and/or UL RS in an earlier slot M<N. Alternatively, the beam (or TCI state) to receive DL-TCI-DCI can be associated with a beam used to receive an SSB associated with the most recent random access procedure, e.g., random access procedure not initiated by a PDCCH order that triggers a contention-free random access procedure. Alternatively, the beam (or TCI state) to receive DL-TCI-DCI can be associated with a beam used to receive a CSI-RS associated with the most recent random access procedure, e.g., random access procedure not initiated by a PDCCH order that triggers a contention-free random access procedure. Optionally, instead of using a default beam for receiving DL-TCI-DCI in slot N, the beam (or TCI state) for receiving the DL-TCI-DCI can be signaled via MAC CE. For example, the mechanism supported in the 3GPP NR specification for updating the TCI state of PDCCH can be reused to update the TCI state (beam) for receiving the DL-TCI-DCI.

At least one of the following examples can be used to determine the value of X and $K_0$.

In one example I.1.1, X is fixed, for example, to X=0 (described below) or X=1. That is, a DL-TCI-DCI is received X slots/subframes prior to every DL-DCI, or prior to the first of a plurality of DL-DCIs (when DL-TCI-DCI indicates TCI states for the reception of a plurality of DL-DCIs). The (value of the) parameter $K_0$ can be configured via DL-DCI. Alternatively, the parameter $K_0$ can be configured via MAC CE based signaling. Alternatively, the parameter $K_0$ can be configured via RRC signaling. Alternatively, the parameter $K_0$ can be configured via a combination of MAC-CE and RRC signaling. Alternatively, the parameter $K_0$ can be configured via a combination of MAC- CE and DL-DCI signaling. Alternatively, the parameter $K_0$ can be configured via a combination of DL-DCI and RRC signaling. Alternatively, the parameter $K_0$ can be configured via a combination of DL-DCI, MAC-CE, and RRC signaling. This example is especially relevant when DL-TCI-DCI is signaled per UE (as opposed to a group of UEs).

In one example I.1.2, X and $K_0$ are configured via two separate parameters. The (value of the) parameter $K_0$ can be configured via DL-DCI. Alternatively, the parameter $K_0$ can be configured via MAC CE based signaling. Alternatively, the parameter $K_0$ can be configured via RRC signaling. Alternatively, the parameter $K_0$ can be configured via a combination of MAC-CE and RRC signaling. Alternatively, the parameter $K_0$ can be configured via a combination of MAC-CE and DL-DCI signaling. Alternatively, the parameter $K_0$ can be configured via a combination of DL-DCI and RRC signaling. Alternatively, the parameter $K_0$ can be configured via a combination of DL-DCI, MAC-CE, and RRC signaling.

The value of X can be selected from a set of values (which may or may not include X=0). Likewise, the (value of the) parameter X can be configured via the DL-TCI-DCI. Alternatively, the parameter X can be configured via MAC CE based signaling. Alternatively, the parameter X can be configured via RRC signaling. Alternatively, the parameter X can be configured via a combination of MAC-CE and RRC signaling. Alternatively, the parameter X can be configured via a combination of MAC-CE and DL-TCI-DCI signaling. Alternatively, the parameter X can be configured via a combination of DL-TCI-DCI and RRC signaling. Alternatively, the parameter X can be configured via a combination of DL-TCI-DCI, MAC-CE, and RRC signaling.

In one example I.1.3, X and $K_0$ are configured via a joint parameter. The (value of the) parameters (X, $K_0$) can be configured via DL-TCI-DCI. Alternatively, the parameters (X, $K_0$) can be configured via MAC CE based signaling. Alternatively, the parameters (X, $K_0$) can be configured via RRC signaling. Alternatively, the parameters (X, $K_0$) can be configured via a combination of MAC-CE and RRC signaling. Alternatively, the parameters (X, $K_0$) can be configured via a combination of MAC-CE and DL-TCI-DCI signaling. Alternatively, the parameters (X, $K_0$) can be configured via a combination of TCI-DCI and RRC signaling. Alternatively, the parameters (X, $K_0$) can be configured via a combination of DL-TCI-DCI, MAC-CE, and RRC signaling. The value of X can be selected from a set of values for (X, $K_0$) (which may or may not include X=0).

In one example I.1.4, $K_0$ is configured, and X can be derived implicitly based on the value of $K_0$. The configuration of the parameter $K_0$ is according to at least one example in example I.1.1.

In one example I.1.5, X is configured, and $K_0$ can be derived implicitly based on the value of X. The configuration of the parameter X is according to at least one example in example I.1.2.

In one example I.1.6, the value of X is not configured, used, and/or set in a particular manner due to the (aperiodic) nature of the DCI signaling (DL-TCI-DCI and/or DL-DCI). Here, the UE monitors the presence of DL-TCI-DCI as well as DL-DCI in each slot/subframe by detecting the presence of the associated IDs (such as C-RNTI or group-RNTI or TCI-RNTI). In this case, the location of the pertinent DL-TCI-DCI can be in any slot relative to the location of the DL-DCI. The applicability of the TCI state signaled in the DL-TCI-DCI can be determined from its location relative to DL-DCI, e.g., to ensure sufficient time for decoding the DL-TCI-DCI so that the TCI state is applicable to some following DL-DCI(s). For example, the UE assumes a minimum TCI state (beam) switching time (in number of slots/subframes or ODFM symbols) from the end of DL-TCI-DCI decoding (i.e., the last symbol carrying DL-TCI-DCI) and the start of DL-TCI reception (i.e., the first symbol carrying DL-DCI). In one example, this switching time is reported by the UE in its capability signaling (or is fixed or is configured to the UE).

Figure 14:
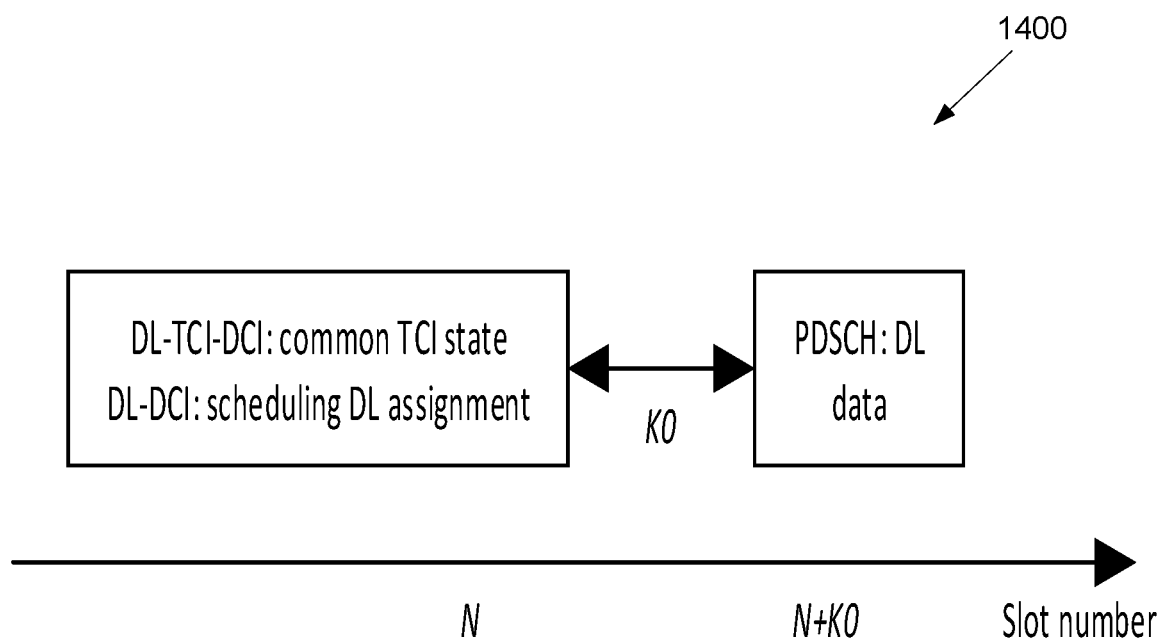
FIG. 14 illustrates an example of receiving DL-TCI-DCI and DL-DCI in the same slot or subframe according to embodiments of the present disclosure.

FIG. 14 illustrates an example of receiving DL-TCI-DCI and DL-DCI in the same slot or subframe 1400. The example of receiving DL-TCI-DCI and DL-DCI in the same slot or subframe 1400 illustrated in FIG. 14 is for illustration only. FIG. 14 does not limit the scope of this disclosure to any particular implementation of the example of receiving DL-TCI-DCI and DL-DCI in the same slot or subframe 1400.

In at least one of the above embodiments (or examples), as shown in FIG. 14, when the value of the parameter X=0, the UE is configured to receive DL-TCI-DCI and DL-DCI in the same slot (or subframe) N. The UE receives/decodes DL-TCI-DCI and DL-DCI in slot (or subframe) N, and obtains the indicated beam (TCI state) from DL-TCI-DCI and scheduling information for the DL assignment from DL-DCI. The UE then receives DL data (PDSCH) according to the DL assignment using the indicated beam in slot N+$K_0$.

Since DL-DCI and DL-TCI-DCI are received in the same slot, the UE can't use the beam indicated via DL-TCI-DCI in the current slot for the reception of DL control (PDCCH carrying DL-DCI). The beam (or TCI state) to receive DL-TCI-DCI and DL-DCI in slot N can be the beam indicated via the latest DL-TCI-DCI in an earlier slot M<N or, optionally, the latest TCI state applicable to the DL-DCI signaled via other means. If the latest DL-TCI-DCI is not received or is not configured, then a default beam can be used. For instance, the default beam for PDCCH reception in the 3GPP NR specification can be used. Alternatively, the beam (or TCI state) to receive DL-TCI-DCI and DL-DCI can be the beam to receive a DL channel and/or DL RS in an earlier slot M<N. Alternatively, the beam (or TCI state) to receive DL-TCI-DCI and DL-DCI can be associated with the beam to transmit a UL channel and/or UL RS in an earlier slot M<N. Optionally, instead of using a default beam for receiving DL-TCI-DCI and DL-DCI in slot N, the beam (or TCI state) for receiving the DL-TCI-DCI can be signaled via MAC CE. For example, the mechanism supported in the 3GPP NR specification for updating the TCI state of PDCCH can be reused to update the TCI state (beam) for receiving the DL-TCI-DCI.

At least one of the following examples can be applicable when the DL-TCI-DCI and DL-DCI are received in the same slot.

In one example I.1.7, DL-TCI-DCI and DL-DCI correspond to (or functionally combined into) a single (joint) DCI including all DCI fields of both DL-TCI-DCI and DL-DCI. In one example, this joint DCI is labelled as DL-TCI-DCI. In one example, this joint DCI is labelled as DL-DCI. In one example, this joint DCI is labelled as DL-TCI-DCI. In one example, this joint DCI is labelled as DL-DCI (e.g., format 1_0, 1_1, and 1_2 in NR specification). In one example, the DL DCI format can include one or both of common beam (TCI state) and DL assignment. At least one of the following examples can be used/configured.

In one example I.1.7.1, the UE decodes the DL_DCI and determines whether only one or both of common beam (TCI state) and DL assignment are included. For example, when the TCI state field in the DCI takes a value (e.g., 0), it indicates that the TCI state (or common beam) is not indicated (or being absent). Likewise, when a parameter in the scheduling assignment field in the DCI takes a value (e.g., 0), it indicates that there is no DL assignment (absent).

In one example I.1.7.2, the information whether only one or both of common beam (TCI state) and DL assignment are included can be configured or activated via MAC CE.

Figure 15:
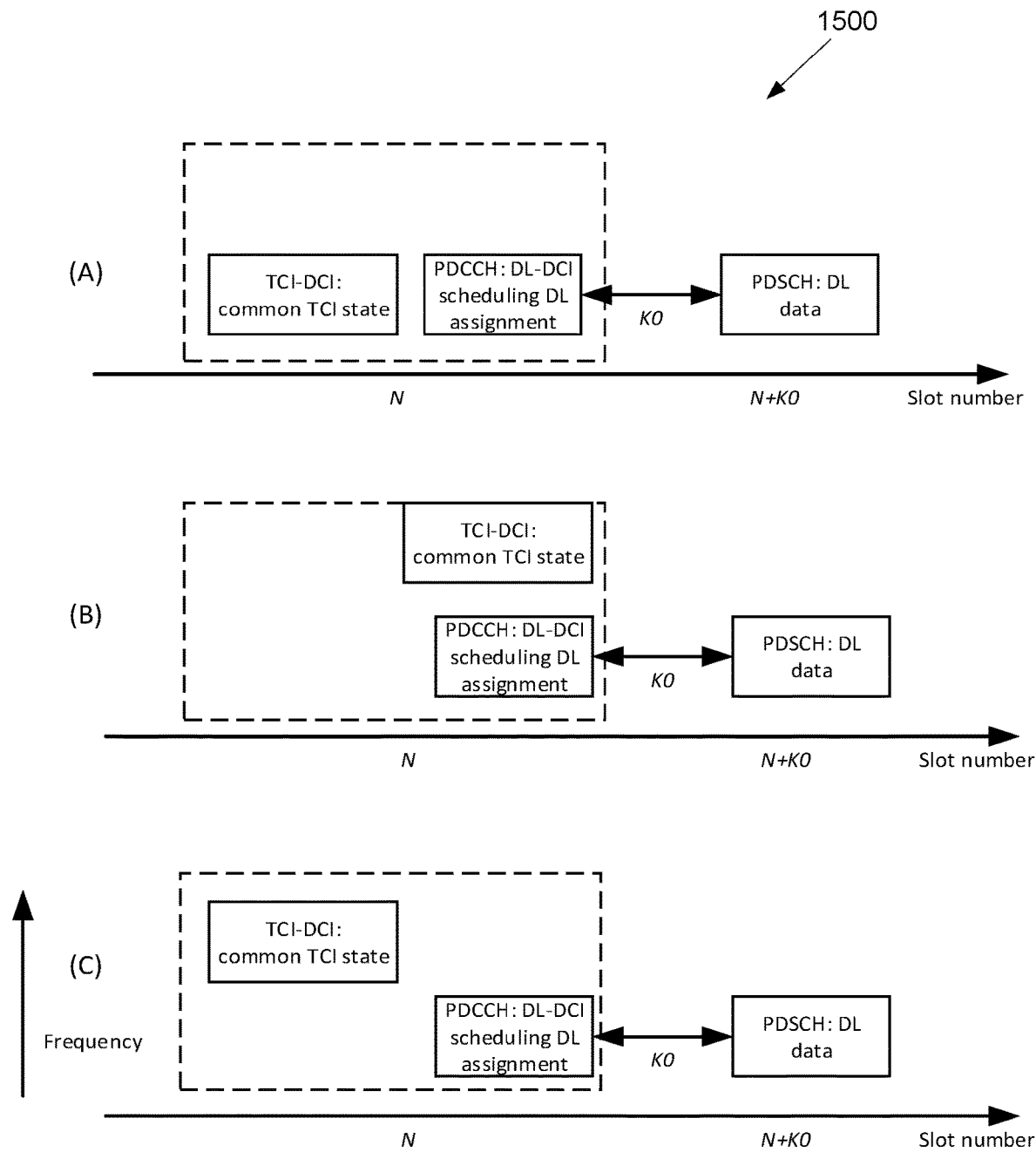
FIG. 15 illustrates an example of the decoding of DL-TCI-DCI and DL-DCI according to embodiments of the present disclosure.

FIG. 15 illustrates an example of the decoding of DL-TCI-DCI and DL-DCI 1500. The example of decoding of DL-TCI-DCI and DL-DCI 1500 illustrated in FIG. 15 is for illustration only. FIG. 15 does not limit the scope of this disclosure to any particular implementation of the example of the decoding of DL-TCI-DCI and DL-DCI 1500.

In one example I.1.8, DL-TCI-DCI can be separate from DL-DCI, but they are in the same slot. A few examples are shown in FIG. 15. In one example, the decoding of TCI-DCI and DL-DCI are independent. In another example, the decoding of TCI-DCI and DL-DCI are not independent. For example, the UE needs to decode DL-TCI-DCI first, and then decodes DL-DCI. If the decoding of DL-TCI-DCI fails, the decoding of DL-DCI also fails. In this later example, DL-TCI-DCI and DL-DCI respectively can be first and second stage DCIs of a two-stage DCI (cf. embodiment 2.5 and 4).

In any of the previously described and following examples and embodiments associated with X=0, the methods can stand alone and, therefore, be implemented without the use of any offset parameter X. In other words, any of such examples or embodiments can be utilized without any parameterization of X, or setting an offset parameter (such as X) to be 0.

In one embodiment I.2, a UE can be configured with a higher layer parameter (and/or MAC CE and/or DL-DCI field) to enable the TCI state (beam) indication via DL-TCI-DCI. For example, a UE can be configured to derive its TCI state update from DL-DCI and/or DL-TCI-DCI depending on the configuration for DL-DCI and/or DL-TCI-DCI. Analogous to embodiment I.1, as shown in FIG. 13, a UE is configured to receive a dedicated DCI (DL-TCI-DCI) indicating the common beam (TCI state) for the reception of DL control (PDCCH) and data (PDSCH). The UE receives (e.g., a DL-TCI-DCI format) and decodes DL-TCI-DCI in slot (or subframe) N, and uses the indicated beam (TCI state) to receive DL control (PDCCH) starting in slot N+X (assuming X>0). The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot N+X+$K_0$. Here, the value of X can be fixed. Alternatively, the value of X can be selected from a set of values. Optionally, the value of X is not configured or set in a particular manner due to the aperiodic nature DCI signaling (DL-TCI-DCI and/or DL-DCI). That is, the time unit location (e.g., slot, subframe) used to signal the DL-TCI-DCI can be different from that used to signal the DL-DCI. The methods in which the values of X and $K_0$ are set are analogous to those applicable for embodiment I.1.

In any of the previously described and following examples and embodiments associated with X=0, the methods can stand alone and, therefore, be implemented without the use of any offset parameter X. In other words, any of such examples or embodiments can be utilized without any parameterization of X, or setting an offset parameter (such as X) to be 0.

In one example I.2.1, when the offset parameter X is used or configured, the resulting UE procedure can be dependent on the value of X. For example, when X=0, DL-TCI-DCI is absent (not received and/or not configured) (or DL-TCI-DCI and DL-DCI correspond to (or functionally combined into) a single (joint) DCI cf. example I.1.7) and the TCI state indication/update is present and signaled/received in the DL-DCI (and is used for the reception of DL data); and when X>0, DL-TCI-DCI is present (configured and hence can be received), and the TCI state indication/update is present and signaled/received in the DL-TCI-DCI (and is used for the reception of both DL data associated with the DL assignment in the DL-DCI, and DL control including the DL-DCI).

In one example I.2.2, regardless of whether the offset parameter X is used/configured or not, the resulting UE procedure can be based on a higher layer (RRC) parameter, e.g., tci-dci-IsPresent. When tci-dci-IsPresent is set to 'enabled', DL-TCI-DCI is present (configured and hence can be received), and the TCI state indication/update is TCI state indication/update in the DL-TCI-DCI (and is used for the reception of both DL data associated with the DL assignment in the DL-DCI, and DL control including the DL-DCI). Otherwise, DL-TCI-DCI is absent (not received and/or not configured) (or DL-TCI-DCI and DL-DCI correspond to (or functionally combined into) a single (joint) DCI cf. example I.1.7) and the TCI state indication/update is present and signaled/received in the DL-DCI (and is used for the reception of DL data).

In one example I.2.3, regardless of whether the offset parameter X is used/configured or not, and regardless of whether a higher-layer parameter controlling the presence of DL-TCI-DCI (e.g., tci-dci-IsPresent) is used/configured or not, the resulting UE procedure can (also) be based on the higher layer parameter tci-PresentInDCI in PDSCH-Config (which controls the presence of DL-DCI). For example, when the parameter tci-dci-IsPresent is 'enabled' and tci-PresentInDCI in PDSCH-Config is also 'enabled', both the DL-TCI-DCI and DL-DCI are present (configured and hence can be received). In this case, the TCI state indication/update applicable for decoding the DL-DCI (in the pertinent PDCCH) is signaled/received in the latest (most recent) DL-TCI-DCI while the TCI state indication/update applicable for decoding the assigned DL data in the pertinent PDSCH (associated with the DL assignment in the DL-DCI) is signaled/received in the latest (most recent) DL-DCI. When the parameter tci-dci-IsPresent is 'enabled' and tci-PresentInDCI in PDSCH-Config is not 'enabled', DL-TCI-DCI is present (configured and hence can be received), and the TCI state indication/update is TCI state indication/update in the DL-TCI-DCI (and is used for the reception of both DL data associated with the DL assignment in the DL-DCI, and DL control including the DL-DCI).

In one example I.2.4, regardless of whether the offset parameter X is used/configured or not, the resulting UE procedure can be based on a higher layer (RRC) parameter and/or MAC CE activation.

In one example I.2.5, regardless of whether the offset parameter X is used/configured or not, the resulting UE procedure can be based on a system information (i.e., for all UEs in a cell).

In one embodiment I.3, a UE can be configured with semi-persistent scheduling (SPS) for DL data (PDSCH) using an RRC information element (IE) sps-Config, which includes the configuration for cs-RNTI (RNTI used for the reception of DCI activating/releasing SPS). A UE shall monitor PDCCH with CRC scrambled by the cs-RNTI in every slot as the gNB can activate/re-activate/release SPS at any time using a DCI (e.g., DCI Format 1_1 or 1_2 in NR). In SPS, the UE is configured with PDSCH reception without any DL-TCI (as in dynamic scheduling explained above).

In one example I.3.1, a UE is configured to receive a dedicated DCI (DL-TCI-DCI) indicating the common beam (TCI state) for the reception of DL control (PDCCH) and if activated by the received PDCCH, also for the reception of DL data (PDSCH). The UE receives (e.g., a DL-TCI-DCI format) and decodes DL-TCI-DCI in slot (or subframe) N, and uses the indicated beam (TCI state) to receive DL control (PDCCH) starting in the same (slot N) or later slot(s). For illustration, let $X_1$ be the gap (in number of slots/subframes) between the slot carrying the DL-TCI-DCI and the slot carrying the DL control, then the UE receives DL control starting in slot $N+X_1$. The UE decodes DCI (e.g., a DCI format) contained in PDCCH to obtain activation information for the DL assignment (via SPS). If PDSCH is activated by the DCI, the UE uses the indicated beam (TCI state) to receive DL data (PDSCH, according to the DL assignment via SPS) in slot $N+X_1+K_1$. Here, the value of $X_1$ can be fixed. Alternatively, the value of $X_1$ can be selected from a set of values. Optionally, the value of $X_1$ is not configured or set in a particular manner due to the aperiodic nature of the DCI signaling (DL-TCI-DCI and/or DCI). That is, the time unit location (e.g., slot, subframe) used to signal the DL-TCI-DCI can be different from that used to signal the DCI. In one example, $X_1=X$ defined earlier in this disclosure. In one example, $X_1=X+K_0$. In one example, $K_1=K_0$.

In one example I.3.2, a UE is configured to receive a dedicated DCI (DL-TCI-DCI) via PDCCH, which includes the common beam (TCI state) for the reception of PDCCH in later slot(s) and, if activated by the received PDCCH, the common beam is also used for the reception of DL data (PDSCH) scheduled by SPS. The UE receives (e.g., a DL-TCI-DCI format) and decodes DL-TCI-DCI in slot (or subframe) N, and uses the indicated beam (TCI state) to receive DL control (PDCCH) starting in later slot(s)). If PDSCH reception is activated by the DL-TCI-DCI, the UE uses the indicated beam (TCI state) to receive DL data (PDSCH, according to the DL assignment via SPS) in slot $N+X_1$. Here, the value of $X_1$ can be fixed. Alternatively, the value of $X_1$ can be selected from a set of values. Optionally, the value of $X_1$ is not configured or set in a particular manner due to the aperiodic nature of the DCI signaling (DL-TCI-DCI). That is, the time unit location (e.g., slot, subframe) used to signal the DL-TCI-DCI can be different from that used to signal the PDSCH. In one example, $X_1=X$ defined earlier in this disclosure. In one example, $X_1=X+K_0$. In one example, $K_1=K_0$.

In one example I.3.3, a UE is configured to receive a dedicated DCI (e.g., DL-TCI-DCI) via PDCCH, which includes (a) a field for the common beam (TCI state) and/or (b) another field for the activation/release of PDSCH reception (according to the configured SPS). When PDSCH reception is activated by field (b), the UE can be indicated/updated with a new (TCI state) beam for PDSCH reception (with or without PDCCH reception) using the field (a). Once PDSCH reception is not activated or released by field (b), the UE can be indicated/updated with a new (TCI state) beam for PDCCH reception only using the field (a).

In this disclosure, a common beam indication for UL data (PUSCH) and UL control (PUCCH) via UL-TCI-DCI is proposed (component 1). The disclosure also proposes a common beam indication for data (PDSCH/PUSCH) and control (PDCCH/PUCCH) for both DL and UL via TCI-DCI (component 2).

Component 1: Common Beam Indication DCI for UL

Figure 16:
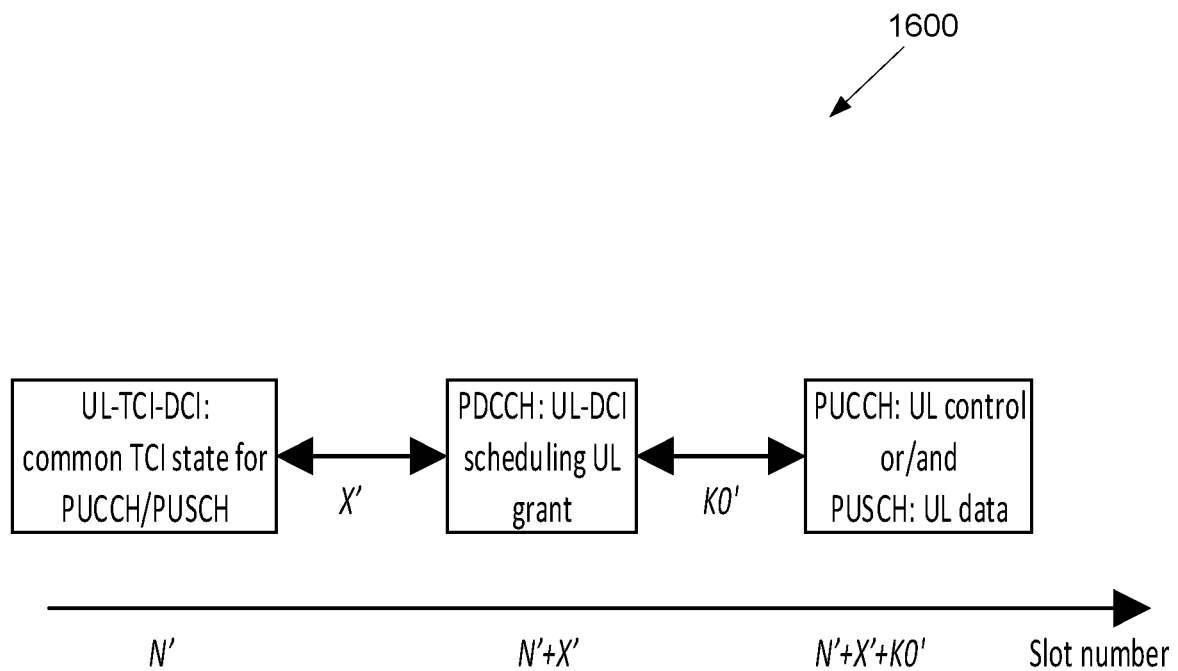
FIG. 16 illustrates an example of a dedicated DCI indicating the common beam for the transmission of UL control and data according to embodiments of the present disclosure.

FIG. 16 illustrates an example of a dedicated DCI indicating the common beam for the transmission of UL control and data 1600. The example of a dedicated DCI indicating the common beam for the transmission of UL control and data 1600 illustrated in FIG. 16 is for illustration only. FIG. 16 does not limit the scope of this disclosure to any particular implementation of the example of a dedicated DCI indicating the common beam for the transmission of UL control and data 1600.

In one embodiment I.4, as shown in FIG. 16, a UE is configured to receive a dedicated DCI (UL-TCI-DCI) indicating the common beam (TCI state) for the transmission of UL control (PUCCH) and data (PUSCH), wherein PUCCH can be associated with (or in response to) DL reception and/or UL transmission. Optionally, the common beam can also be used for the transmission of PRACH. The UE receives (e.g., a UL-TCI-DCI format) and decodes UL-TCI-DCI in slot (or subframe) N', and uses either the indicated beam (TCI state) or another TCI state (beam) to receive DL control (PDCCH) starting in the same (slot N') or later slot(s). For illustration, let X' be the gap (in number of slots/subframes) between the slot carrying the DL-TCI-DCI and the slot carrying the DL control, then the UE receives DL control starting in slot N'+X'. The UE decodes UL-DCI (e.g., a UL-DCI format) contained in PDCCH to obtain scheduling information for the UL grant. The UE uses the indicated beam (TCI state) in UL-TCI-DCI to transmit UL control (PUCCH) and/or UL data (PUSCH, according to the UL grant) in slot N'+X'+K'. Here, the value of X' can be fixed. Alternatively, the value of X' can be selected from a set of values. Optionally, the value of X' is not configured or set in a particular manner due to the aperiodic nature of the DCI signaling (UL-TCI-DCI and/or UL-DCI). That is, the time unit location (e.g., slot, subframe) used to signal the UL-TCI-DCI can be different from that used to signal the UL-DCI. In some examples, X' can also be referred to as a uplink beam application time (UL-BAT) value B'. In some example, X' is lower bounded by B', i.e., X'>B'.

In an example, the unit of N' and/or X' and/or K' is defined in terms of number of OFDM symbols. The value X' is measured from the end of UL-TCI-DCI decoding (i.e., the last symbol carrying UL-TCI-DCI) and the start of UL-DCI reception (i.e., the first symbol carrying UL-DCI), or the value X' is determined as the first slot that is at least P' ms or Q' symbols after the UL-TCI-DCI with the common beam indication, where P' or Q' can be fixed, or configured, or determined/configured based on UE capability reporting). Likewise, the value $K_0$ is measured from the end of UL-DCI decoding (i.e. the last symbol carrying UL-DCI) and the start of PUCCH/PUSCH transmission (i.e., the first symbol carrying PUCCH/PUSCH). In the rest of the disclosure, the unit of N', X', and $K_0'$ is assumed to be in terms of time slots (or subframes). The embodiments of the disclosure, however, are general and are applicable to any units such as number of OFDM symbols.

In an example, the value of X' is set/determined based on the UE's processing restriction (i.e., the processing latency) or capability. When a new beam (TCI state) is indicated via UL-TCI-DCI, it can be used for the reception of UL-DCI not earlier than X' time (slots or subframes or OFDM symbols)) where X' is subject to (or determined/configured based on) the UE capability.

In one example, a UE is configured/triggered with a PUCCH transmission (e.g., for the HARQ-ACK feedback) that can be associated with a DL (e.g., PDSCH) reception, which is triggered (or scheduled) by DL-DCI. In this case, the TCI state (beam) for the PUCCH transmission is indicated/updated via either UL-TCI-DCI (cf. embodiment I.4 through I.6 below) or DL-TCI-DCI.

When the PDCCH carrying the UL-TCI-DCI is associated with (configured) with a HARQ-ACK (or ACK/NACK) feedback (e.g. via a PUCCH transmission) indicating that the UE receives the updated common beam, then the beam application time may include the time between the PDCCH reception (either from the start or the end of PDCCH reception) and the corresponding PUCCH transmission (either from the start or the end of PUCCH transmission), i.e., $X'=Y_1+Y_2$ where $Y_1$=the time between PDCCH reception and PUCCH transmission, and $Y_2$=the time between PUCCH transmission and UL-DCI reception. Alternatively, the beam application time equals $Y_2$. In this case, the TCI state (beam) for the PUCCH transmission can be the latest (previously) beam that is indicated via UL-TCI-DCI prior to the new/updated TCI state in the current slot.

The beam (or TCI state) to receive UL-TCI-DCI in slot N' can be the beam (or TCI state) indicated via the latest UL-TCI-DCI in an earlier slot M'<N'. If the latest UL-TCI-DCI is not received or is not configured, then a default beam can be used. For instance, the default beam for PDCCH reception in the 3GPP NR specification can be used. Alternatively, the beam (or TCI state) to receive UL-TCI-DCI can be the beam to receive a DL channel and/or DL RS in an earlier slot M'<N'. Alternatively, the beam (or TCI state) to receive UL-TCI-DCI can be associated with the beam to transmit a UL channel and/or UL RS in an earlier slot M'<N'. Alternatively, the beam (or TCI) to receive UL-TCI-DCI can be associated with a beam used to receive an SSB associated with the most recent random access procedure, e.g., random access procedure not initiated by a PDCCH order that triggers a contention-free random access procedure. Alternatively, the beam (or TCI) to receive UL-TCI-DCI can be associated with a beam used to receive a CSI-RS associated with the most recent random access procedure, e.g., random access procedure not initiated by a PDCCH order that triggers a contention-free random access procedure. Optionally, instead of using a default beam for receiving UL-TCI-DCI in slot N', the beam (or TCI state) for receiving the UL-TCI-DCI can be signaled via MAC CE. For example, the mechanism supported in the 3GPP NR specification for updating the TCI state of PDCCH can be reused to update the TCI state (beam) for receiving the UL-TCI-DCI.

At least one of the following examples can be used to determine the value of X' and $K_0'$.

Example I.4.1 through example I.4.5 in which the values of X' and $K_0'$ are set are analogous to example I.1.1 through example I.1.5 (X and $K_0$) in embodiment I.1.

In one example I.4.6, the value of X' is not configured, used, and/or set in a particular manner due to the (aperiodic) nature of the DCI signaling (UL-TCI-DCI and/or UL-DCI). Here, the UE monitors the presence of UL-TCI-DCI as well as UL-DCI in each slot/subframe by detecting the presence of the associated IDs (such as C-RNTI or group-RNTI or TCI-RNTI). In this case, the location of the pertinent UL-TCI-DCI can be in any slot relative to the location of the UL-DCI. The applicability of the TCI state signaled in the UL-TCI-DCI can be determined from its location relative to UL-DCI, e.g., to ensure sufficient time for decoding the UL-TCI-DCI so that the TCI state is applicable to some following UL-DCI(s). For example, the UE assumes a minimum TCI state (beam) switching time (in number of slots/subframes or ODFM symbols) from the end of UL-TCI-DCI decoding (i.e., the last symbol carrying UL-TCI-DCI) and the start of UL-TCI reception (i.e., the first symbol carrying UL-DCI). In one example, this switching time is reported by the UE in its capability signaling (or is fixed or is configured to the UE).

In any of the previously described and following examples and embodiments associated with X'=0, the methods can stand alone and, therefore, be implemented without the use of any offset parameter X'. In other words, any of such examples or embodiments can be utilized without any parameterization of X', or setting an offset parameter (such as X') to be 0.

Figure 17:
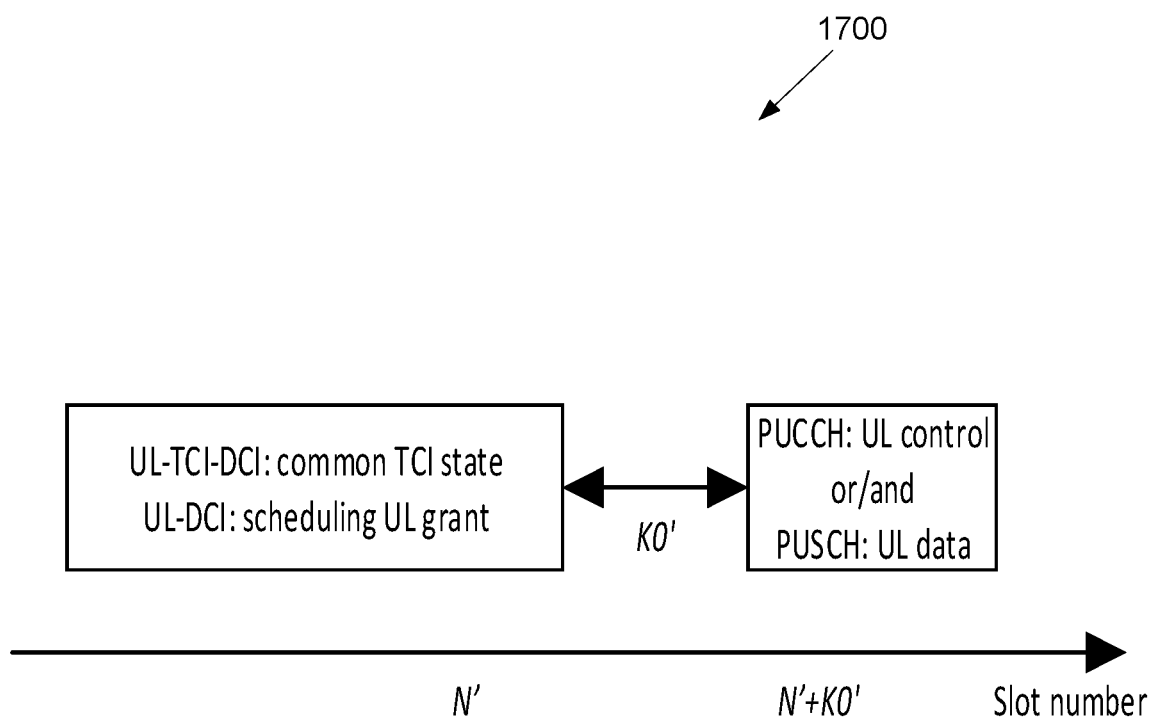
FIG. 17 illustrates an example of receiving UL-TCI-DCI and UL-DCI in the same slot or subframe according to embodiments of the present disclosure.

FIG. 17 illustrates an example of receiving UL-TCI-DCI and UL-DCI in the same slot or subframe 1700. The example of receiving UL-TCI-DCI and UL-DCI in the same slot or subframe 1700 illustrated in FIG. 17 is for illustration only. FIG. 17 does not limit the scope of this disclosure to any particular implementation of the example of receiving UL-TCI-DCI and UL-DCI in the same slot or subframe 1700.

In at least one of the above embodiments (or examples), as shown in FIG. 17, when the value of the parameter X'=0, i.e., the UE is configured to receive UL-TCI-DCI and UL-DCI in the same slot (or subframe) N'. The UE receives/decodes UL-TCI-DCI and UL-DCI in slot (or subframe) N', and obtains the indicated beam (TCI state) from UL-TCI-DCI and scheduling information for the UL grant from UL-DCI. The UE then transmits UL control (PUCCH) and/or UL data (PUSCH, according to the UL grant) using the indicated beam in slot N'+K'.

Since UL-DCI and UL-TCI-DCI are received in the same slot, the UE can't use the beam indicated via UL-TCI-DCI in the current slot for the reception of DL control (PDCCH carrying UL-DCI). The beam (or TCI state) to receive UL-TCI-DCI and UL-DCI in slot N' can be the beam indicated via the latest UL-TCI-DCI in an earlier slot M'<N' or, optionally, the latest TCI state applicable to the UL-DCI signaled via other means. If the latest UL-TCI-DCI is not received or is not configured, then a default beam can be used. For instance, the default beam for PDCCH reception in the 3GPP NR specification can be used. Alternatively, the beam (or TCI state) to receive UL-TCI-DCI and UL-DCI can be the beam to receive a DL channel and/or DL RS in an earlier slot M'<N'. Alternatively, the beam (or TCI state) to receive UL-TCI-DCI and UL-DCI can be associated with the beam to transmit a UL channel and/or UL RS in an earlier slot M'<N'. Optionally, instead of using a default beam for receiving UL-TCI-DCI and UL-DCI in slot N', the beam (or TCI state) for receiving the UL-TCI-DCI can be signaled via MAC CE. For example, the mechanism supported in the 3GPP NR specification for updating the TCI state of PDCCH can be reused to update the TCI state (beam) for receiving the UL-TCI-DCI.

At least one of the following examples can be applicable when the UL-TCI-DCI and UL-DCI are received in the same slot.

In one example I.4.7, UL-TCI-DCI and UL-DCI correspond to (or functionally combined into) a single (joint) DCI including all DCI fields of both UL-TCI-DCI and UL-DCI. In one example, this joint DCI is labelled as UL-TCI-DCI. In one example, this joint DCI is labelled as UL-DCI (e.g., format 0_0, 0_1, or 0_2 in NR specification). In one example, the UL-DCI format can include one or both of common beam (TCI state) for UL transmission and UL grant. At least one of the following examples can be used/configured.

In example I.4.7.1, the UE decodes the UL-DCI and determines whether only one or both of common beam (TCI state) and UL grant are included. For example, when the TCI state field in the DCI takes a value (e.g., 0), it indicates that the TCI state (or common beam) is not indicated (or being absent). Likewise, when a parameter in the scheduling assignment field in the DCI takes a value (e.g., 0), it indicates that there is no UL grant (absent).

In example I.4.7.2, the information whether only one or both of common beam (TCI state) and UL grant are included can be configured via RRC or activated via MAC CE.

In one example I.4.8, UL-TCI-DCI can be separate from UL-DCI, but they are in the same slot. The rest of the details are analogous to example I.1.8.

In one example I.4.9, UL-TCI-DCI and DL-DCI (scheduling DL assignment) correspond to (or functionally combined into) a single (joint) DCI including all DCI fields of both UL-TCI-DCI and DL-DCI. In one example, this joint DCI is labelled as UL-TCI-DCI. In one example, this joint DCI is labelled as DL-DCI (e.g., format 1_0, 1_1, or 1_2 in NR specification). In one example, the DL-DCI format can include one or both of common beam (TCI state) for UL transmission and DL assignment. At least one of the following examples can be used/configured.

In example I.4.9.1, the UE decodes the DL-DCI and determines whether only one or both of common beam (TCI state) and DL assignment are included. For example, when the TCI state field in the DCI takes a value (e.g., 0), it indicates that the TCI state (or common beam) is not indicated (or being absent). Likewise, when a parameter in the scheduling assignment field in the DCI takes a value (e.g., 0), it indicates that there is no DL assignment (absent).

In example I.4.9.2, the information whether only one or both of common beam (TCI state) and DL assignment are included can be configured via RRC or activated via MAC CE.

In one embodiment I.5 a UE can be configured with a higher layer parameter (and/or MAC CE and/or DL-DCI field) to enable the TCI state (beam) indication via UL-TCI-DCI. For example, a UE can be configured to derive its TCI state update from UL-DCI and/or UL-TCI-DCI depending on the configuration for UL-DCI and/or UL-TCI-DCI. The rest of the details are analogous to the corresponding embodiment I.2 for DL.

In one example I.5.1, when the offset parameter X' is used or configured, the resulting UE procedure can be dependent on the value of X'. For example, when X'=0, UL-TCI-DCI is absent (not received and/or not configured) (or UL-TCI-DCI and UL-DCI correspond to (or functionally combined into) a single (joint) DCI cf. example I.4.7) and the TCI state indication/update is present and signaled/received in the UL-DCI (and is used for the transmission of UL data); and when X>0, UL-TCI-DCI is present (configured and hence can be received), and the TCI state indication/update is present and signaled/received in the UL-TCI-DCI (and is used for the transmission of UL data and/or UL control).

In one example I.5.2, regardless of whether the offset parameter X' is used/configured or not, the resulting UE procedure can be based on a higher layer (RRC) parameter, e.g., ul-tci-dci-IsPresent. When ul-tci-dci-IsPresent is set to 'enabled', UL-TCI-DCI is present (configured and hence can be received), and the TCI state indication/update is TCI state indication/update in the UL-TCI-DCI (and is used for the transmission of UL data and/or UL control). Otherwise, UL-TCI-DCI is absent (not received and/or not configured) (or UL-TCI-DCI and UL-DCI correspond to (or functionally combined into) a single (joint) DCI cf. example I.4.7) and the TCI state indication/update is present and signaled/received in the UL-DCI (and is used for the transmission of UL data).

In one example I.5.3, regardless of whether the offset parameter X' is used/configured or not, and regardless of whether a higher-layer parameter controlling the presence of UL-TCI-DCI (e.g., ul-tci-dci-IsPresent) is used/configured or not, the resulting UE procedure can (also) be based on the higher layer parameter tci-PresentInDCI in PUSCH-Config (which controls the presence of UL-DCI) or in PDSCH-Config. For example, when the parameter ul-tci-dci-IsPresent is 'enabled' and tci-PresentInDCI is also 'enabled', both the UL-TCI-DCI and UL-DCI are present (configured and hence can be received). In this case, the TCI state indication/update applicable for decoding the UL-DCI (in the pertinent PDCCH) is signaled/received in the latest (most recent) UL-TCI-DCI while the TCI state indication/update applicable for transmission of the UL data in the pertinent PUSCH (associated with the UL grant in the UL-DCI) is signaled/received in the latest (most recent) UL-DCI. When the parameter ul-tci-dci-IsPresent is 'enabled' and tci-PresentInDCI is not 'enabled', UL-TCI-DCI is present (configured and hence can be received), and the TCI state indication/update is TCI state indication/update in the UL-TCI-DCI (and is used for the transmission of both UL data associated with the UL grant in the UL-DCI, and UL control).

In one example I.5.4, regardless of whether the offset parameter X' is used/configured or not, the resulting UE procedure can be based on a higher layer (RRC) parameter and/or MAC CE activation.

In one example I.5.5, regardless of whether the offset parameter X' is used/configured or not, the resulting UE procedure can be based on a system information (i.e., for all UEs in a cell).

In any of the previously described and following examples and embodiments associated with X'=0, the methods can stand alone and, therefore, be implemented without the use of any offset parameter X'. In other words, any of such examples or embodiments can be utilized without any parameterization of X', or setting an offset parameter (such as X') to be 0.

In one embodiment I.6, a UE can be configured with PUSCH transmission(s) that correspond to a configured grant Type 1 or Type 2. The configured grant Type 1 PUSCH transmission is semi-statically configured to operate upon the reception of higher layer parameter of configuredGrant-Config including rrc-ConfiguredUplinkGrant without the detection of an UL grant in a DCI. The configured grant Type 2 PUSCH transmission is semi-persistently scheduled (SPS) by an UL grant in a valid activation DCI after the reception of higher layer parameter configuredGrantConfig not including rrc-ConfiguredUplinkGrant. If Configuredgrantconfig-ToAddModList-r16 is configured, more than one configured grant configuration of configured grant Type 1 and/or configured grant Type 2 may be active at the same time on an active BWP of a serving cell. For the configured grant Type 2 PUSCH transmission, the UE is configured with cs-RNTI (RNTI used for the reception of DCI activating/releasing SPS). A UE shall monitor PDCCH with CRC scrambled by the cs-RNTI in every slot as the gNB can activate/re-activate/release SPS at any time using a DCI (e.g., DCI Format 0_1 or 0_2 in NR).

A UE can be configured with PUCCH transmission(s) that correspond to a periodic or semi-persistent CSI-report sent on PUCCH. Such PUCCH transmissions are configured by CSI-ReportConfig, without the detection of an UL grant in a UL-DCI. The semi-persistent CSI report on PUCCH can be activated/de-activated by a MAC CE.

In one example I.6.1, a UE is configured to receive a dedicated DCI (UL-TCI-DCI) indicating the common beam (TCI state) for the transmission of UL control (PUCCH) and/or data (PUSCH) if activated by the received PDCCH. The UE receives (e.g., a UL-TCI-DCI format) and decodes UL-TCI-DCI in slot (or subframe) N', and uses the indicated beam (TCI state) to receive DL control (PDCCH) starting in the same (slot N') or later slot(s). For illustration, let $X_1'$ be the gap (in number of slots/subframes) between the slot carrying the UL-TCI-DCI and the slot carrying the DL control, then the UE receives DL control starting in slot $N'+X_1'$. The UE decodes DCI (e.g., a DCI format) contained in PDCCH to obtain activation information for the UL assignment (for the configured grant Type 2 PUSCH transmission). If PUSCH is activated by the DCI, the UE uses the indicated beam (TCI state) to transmit UL data (PUSCH, according to the UL assignment) in slot $N'+X_1'+K_1'$. Here, the value of $X_1'$ can be fixed. Alternatively, the value of $X_1'$ can be selected from a set of values. Optionally, the value of $X_1'$ is not configured or set in a particular manner due to the aperiodic nature of the DCI signaling (UL-TCI-DCI and/or DCI). That is, the time unit location (e.g., slot, subframe) used to signal the UL-TCI-DCI can be different from that used to signal the DCI. In one example, $X_1'=X'$ defined earlier in this disclosure. In one example, $X_1'=X'+K_0'$. In one example, $K_1'=K_0'$.

In one example I.6.2, a UE is configured to receive a dedicated DCI (UL-TCI-DCI) via PDCCH, which includes the common beam (TCI state) for the reception of PDCCH in later slot(s) and, if activated by the received PDCCH, the common beam is also used for the transmission of UL data (PUSCH) (for the configured grant Type 2 PUSCH transmission). The UE receives (e.g., a UL-TCI-DCI format) and decodes UL-TCI-DCI in slot (or subframe) N', and uses the indicated beam (TCI state) to receive DL control (PDCCH) starting in later slot(s).). If PUSCH transmission is activated by the UL-TCI-DCI, the UE uses the indicated beam (TCI state) to transmit UL data (PUSCH, according to the UL assignment) in slot $N'+X_1'$. Here, the value of $X_1'$ can be fixed. Alternatively, the value of $X_1'$ can be selected from a set of values. Optionally, the value of $X_1'$ is not configured or set in a particular manner due to the aperiodic nature of the DCI signaling (UL-TCI-DCI). That is, the time unit location (e.g., slot, subframe) used to signal the UL-TCI-DCI can be different from that used to signal the PUSCH. In one example, $X_1'=X'$ defined earlier in this disclosure. In one example, $X_1'=X'+K_0'$. In one example, $K_1'=K_0'$.

In one example I.6.3, a UE is configured to receive a dedicated DCI (UL-TCI-DCI) indicating the common beam (TCI state) for the transmission of UL control (PUCCH) and/or data (PUSCH). The UE receives (e.g., a UL-TCI-DCI format) and decodes UL-TCI-DCI in slot (or subframe) N', and uses the indicated beam (TCI state) to transmit UL control (PUCCH) (e.g., periodic PUCCH or semi-persistent PUCCH) and/or data (PUSCH) (e.g., configured grant Type 1) starting in the same (slot N') or later slot(s). For illustration, let $X_1'$ be the gap (in number of slots/subframes) between the slot carrying the UL-TCI-DCI and the slot carrying the UL transmission, then the UE can start using the indicated beam (TCI state) for uplink transmission in slot $N'+X_1'$. Here, the value of $X_1'$ can be fixed. Alternatively, the value of $X_1'$ can be selected from a set of values. Optionally, the value of $X_1'$ is not configured or set in a particular manner due to the aperiodic nature of the DCI signaling (UL-TCI-DCI and/or DCI). That is, the time unit location (e.g., slot, subframe) used to signal the UL-TCI-DCI can be different from that used to signal the DCI. In one example, $X_1'=X'$ defined earlier in this disclosure. In one example, $X_1'=X'+K_0'$. In one example, $K_1'=K_0'$.

In one embodiment I.7, a UE can be configured to receive a dedicated DCI (RACH-TCI-DCI) indicating the common beam (TCI state) for the transmission of PDCCH-triggered contention-free random access (CFRA) preambles, such PDCCH is known as a PDCCH order, which can be a DCI format 1_0 with the "frequency domain resource assignment" field set to all ones as described in TS 38.212. In this example and its sub-examples, a PDCCH order is for a contention free random access preamble transmission. The UE receives (e.g., a RACH-TCI-DCI format) and decodes RACH-TCI-DCI in slot (or subframe) N', and uses either the indicated beam (TCI state) or another TCI state (beam) to receive DL control (PDCCH order) starting in the same (slot N') or later slot(s). For illustration, let X' be the gap (in number of slots/subframes) between the slot carrying the RACH-TCI-DCI and the slot carrying the DL control (i.e., PDCCH order), then the UE receives DL control starting in slot N'+X'. The UE decodes the PDCCH order to obtain preamble transmission parameters (i.e., preamble index and PRACH transmission occasion). The UE uses the indicated beam (TCI state) in RACH-TCI-DCI to transmit CFRA preamble starting in slot $N'+X'+K_0'$ in the indicated PRACH occasions. Here, the value of X' can be fixed. Alternatively, the value of X' can be selected from a set of values. Optionally, the value of X' is not configured or set in a particular manner due to the aperiodic nature of the DCI signaling (RACH-TCI-DCI and/or PDCCH order). That is, the time unit location (e.g., slot, subframe) used to signal the RACH-TCI-DCI can be different from that used to signal the PDCCH order.

In an example, the unit of N' and/or X' and/or $K_0'$ is defined in terms of number of OFDM symbols. The value X' is measured from the end of RACH-TCI-DCI decoding (i.e., the last symbol carrying RACH-TCI-DCI) and the start of PDCCH order reception (i.e., the first symbol carrying PDCCH order). Likewise, the value $K_0'$ is measured from the end of PDCCH order decoding (i.e., the last symbol carrying PDCCH order) and the earliest possible start of the PRACH preamble. In the rest of the disclosure, the unit of N', X', and $K_0'$ is assumed to be in terms of time slots (or subframes). The embodiments of the disclosure, however, are general and are applicable to any units such as number of OFDM symbols.

The beam (or TCI state) to receive RACH-TCI-DCI in slot N' can be the beam (or TCI state) indicated via the latest RACH-TCI-DCI in an earlier slot M'<N'. If the latest RACH-TCI-DCI is not received or is not configured, then a default beam can be used. For instance, the default beam for PDCCH reception in the 3GPP NR specification can be used. Alternatively, the beam (or TCI state) to receive RACH-TCI-DCI can be the beam to receive a DL channel and/or DL RS in an earlier slot M'<N'. Alternatively, the beam (or TCI state) to receive RACH-TCI-DCI can be associated with the beam to transmit a UL channel and/or UL RS in an earlier slot M'<N'. Alternatively, the beam (or TCI) to receive RACH-TCI-DCI can be associated with a beam used to receive an SSB associated with the most recent random access procedure, e.g., random access procedure not initiated by a PDCCH order that triggers a contention-free random access procedure. Alternatively, the beam (or TCI) to receive RACH-TCI-DCI can be associated with a beam used to receive a CSI-RS associated with the most recent random access procedure, e.g., random access procedure not initiated by a PDCCH order that triggers a contention-free random access procedure. Optionally, instead of using a default beam for receiving RACH-TCI-DCI in slot N', the beam (or TCI state) for receiving the RACH-TCI-DCI can be signaled via MAC CE. For example, the mechanism supported in the 3GPP NR specification for updating the TCI state of PDCCH can be reused to update the TCI state (beam) for receiving the RACH-TCI-DCI.

At least one of the following examples can be used to determine the value of X' and $K_0'$.

Example I.7.1 through example I.7.5 in which the values of X' and $K_0'$ are set are analogous to example I.1.1 through example I.1.5 (X and $K_0$) in embodiment I.1.

In one example I.7.6, the value of X' is not configured, used, and/or set in a particular manner due to the (aperiodic) nature of the DCI signaling (RACH-TCI-DCI and/or PDCCH order). Here, the UE monitors the presence of RACH-TCI-DCI as well as PDCCH order in each slot/subframe by detecting the presence of the associated IDs (such as C-RNTI or group-RNTI or TCI-RNTI). In this case, the location of the pertinent RACH-TCI-DCI can be in any slot relative to the location of the PDCCH order. The applicability of the TCI state signaled in the RACH-TCI-DCI can be determined from its location relative to PDCCH order, e.g., to ensure sufficient time for decoding the RACH-TCI-DCI so that the TCI state is applicable to some following PDCCH order(s). For example, the UE assumes a minimum TCI state (beam) switching time (in number of slots/subframes or ODFM symbols) from the end of RACH-TCI-DCI decoding (i.e., the last symbol carrying RACH-TCI-DCI) and the start of PDCCH order reception (i.e., the first symbol carrying PDCCH order). In one example, this switching time is reported by the UE in its capability signaling (or is fixed or is configured to the UE).

In any of the previously described and following examples and embodiments associated with X'=0, the methods can stand alone and, therefore, be implemented without the use of any offset parameter X'. In other words, any of such examples or embodiments can be utilized without any parameterization of X', or setting an offset parameter (such as X') to be 0.

In at least one of the above embodiments (or examples), when the value of the parameter X'=0, i.e., the UE is configured to receive RACH-TCI-DCI and PDCCH order in the same slot (or subframe) N'. The UE receives/decodes RACH-TCI-DCI and PDCCH order in slot (or subframe) N', and obtains the indicated beam (TCI state) from RACH-TCI-DCI and scheduling information for the UL grant from PDCCH order. The UE then transmits PRACH preamble (according to the PDCCH order) using the indicated beam in an indicated PRACH occasion starting at slot $N'+K_0'$.

Since PDCCH order and RACH-TCI-DCI are received in the same slot, the UE can't use the beam indicated via RACH-TCI-DCI in the current slot for the reception of DL control (PDCCH order). The beam (or TCI state) to receive RACH-TCI-DCI and PDCCH order in slot N' can be the beam indicated via the latest RACH-TCI-DCI in an earlier slot M'<N' or, optionally, the latest TCI state applicable to the PDCCH order signaled via other means. If the latest RACH-TCI-DCI is not received or is not configured, then a default beam can be used. For instance, the default beam for PDCCH reception in the 3GPP NR specification can be used. Alternatively, the beam (or TCI state) to receive PDCCH-TCI-DCI and PDCCH order can be the beam to receive a DL channel and/or DL RS in an earlier slot M'<N'. Alternatively, the beam (or TCI state) to receive RACH-TCI-DCI and PDCCH order can be associated with the beam to transmit a UL channel and/or UL RS in an earlier slot M'<N'. Optionally, instead of using a default beam for receiving RACH-TCI-DCI and PDCCH order in slot N', the beam (or TCI state) for receiving the RACH-TCI-DCI can be signaled via MAC CE. For example, the mechanism supported in the 3GPP NR specification for updating the TCI state of PDCCH can be reused to update the TCI state (beam) for receiving the RACH-TCI-DCI.

At least one of the following examples can be applicable when the RACH-TCI-DCI and PDCCH order are received in the same slot.

In one example I.7.7, RACH-TCI-DCI and PDCCH order correspond to (or functionally combined into) a single (joint) DCI including all DCI fields of both RACH-TCI-DCI and PDCCH order. In one example, this joint DCI is labelled as RACH-TCI-DCI. In one example, this joint DCI is labelled as PDCCH order.

In one example I.7.8, RACH-TCI-DCI can be separate from PDCCH order, but they are in the same slot. The rest of the details are analogous to example I.1.8.

In one example I.7.9, a RACH-TCI-DCI can be an UL-TCI-DCI in the above examples.

Component 2: Common Beam Indication DCI for DL and UL

Figure 18:
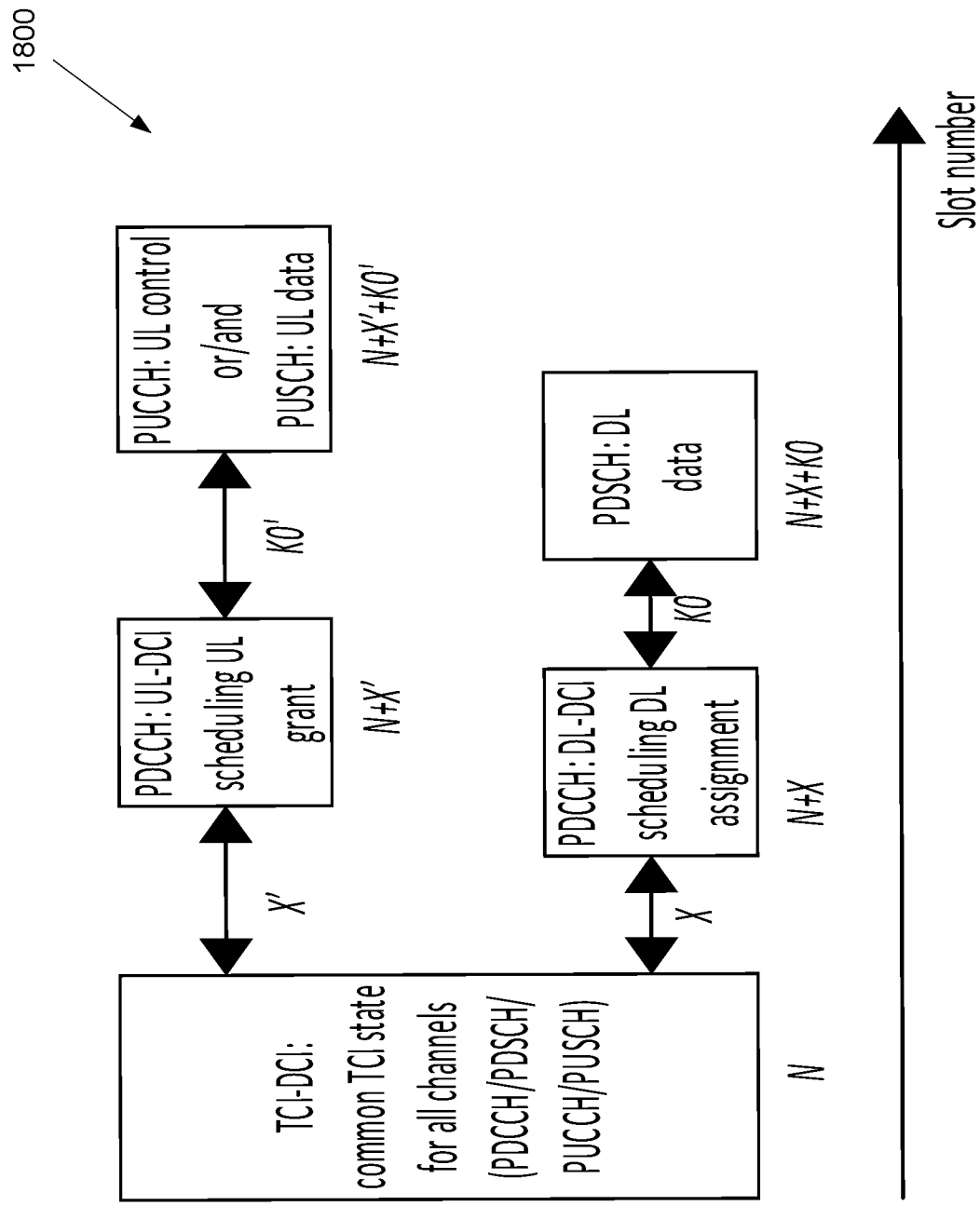
FIG. 18 illustrates an example of a dedicated DCI indicating the common beam for all DL and UL channels according to embodiments of the present disclosure.

FIG. 18 illustrates an example of a dedicated DCI indicating the common beam for all DL and UL channels 1800. The example of a dedicated DCI indicating the common beam for all DL and UL channels 1800 illustrated in FIG. 18 is for illustration only. FIG. 18 does not limit the scope of this disclosure to any particular implementation of the example of a dedicated DCI indicating the common beam for all DL and UL channels 1800.

In embodiment I.8, as shown in FIG. 18, a UE is configured to receive a dedicated DCI (TCI-DCI) indicating the common beam (TCI state) for all DL and UL channels. In particular, the indicated common beam is used for the reception of DL control (PDCCH) and DL data (PDSCH) as well as for the transmission of UL control (PUCCH) and UL data (PUSCH), wherein PUCCH can be associated with (or in response to) DL reception and/or UL transmission. Optionally, the common beam can also be used for the transmission of PRACH (cf. embodiment I.7). The UE receives (e.g., a TCI-DCI format) and decodes TCI-DCI in slot (or subframe) N, and uses either the indicated beam (TCI state) or another TCI state (beam) to receive DL control (PDCCH) scheduling DL assignment (via DL-DCI) and/or UL grant (via UL-DCI) starting in the same (slot N) or later slot(s).

For DL, let X be the gap (in number of slots/subframes) between the slot carrying the TCI-DCI and the slot carrying the DL control scheduling DL assignment (via DL-DCI), then the UE receives DL control starting in slot N+X. The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot $N+X+K_0$. Here, the value of X can be fixed. Alternatively, the value of X can be selected from a set of values. Optionally, the value of X is not configured or set in a particular manner due to the aperiodic nature of the DCI signaling (TCI-DCI and/or DL-DCI). That is, the time unit location (e.g., slot, subframe) used to signal the TCI-DCI can be different from that used to signal the DL-DCI. The methods in which the values of X and $K_0$ are set and their units (number of slots or subframes or OFDM symbols) are analogous to those applicable for embodiment I.1. In some examples, X can also be referred to as a downlink beam application time (DL-BAT) B. In some examples, X is lower bounded by B, i.e., X≥B.

For UL, let X' be the gap (in number of slots/subframes) between the slot carrying the TCI-DCI and the slot carrying the DL control scheduling UL grant (via UL-DCI), then the UE receives DL control starting in slot N'+X'. The UE decodes UL-DCI (e.g., a UL-DCI format) contained in PDCCH to obtain scheduling information for the UL grant. The UE uses the indicated beam (TCI state) in TCI-DCI to transmit UL control (PUCCH) and/or UL data (PUSCH, according to the UL grant) in slot N'+X'+$K_0$'. Here, the value of X' can be fixed. Alternatively, the value of X' can be selected from a set of values. Optionally, the value of X' is not configured or set in a particular manner due to the aperiodic nature of the DCI signaling (TCI-DCI and/or UL-DCI). That is, the time unit location (e.g., slot, subframe) used to signal the TCI-DCI can be different from that used to signal the UL-DCI. The methods in which the values of X' and $K_0$ are set and their units (number of slots or subframes or OFDM symbols) are analogous to those applicable for embodiment I.4. In some examples, X' can also be referred to as a uplink beam application time (UL-BAT) B'. In some examples, X' is lower bounded by B', i.e., X'≥B'.

In an example, the value X is measured from the end of TCI-DCI decoding (i.e., the last symbol carrying TCI-DCI) and the start of DL-DCI reception (i.e., the first symbol carrying DL-DCI), or the value X is determined as the first slot that is at least P ms or Q symbols after the TCI-DCI with the common beam indication, where P or Q can be fixed, or configured, or determined/configured based on UE capability reporting). Likewise, the value $K_0$ is measured from the end of DL-DCI decoding (i.e., the last symbol carrying DL-DCI) and the start of PDSCH reception (i.e., the first symbol carrying PDSCH). The unit of N, X, and $K_0$ is assumed to be in terms of time slots (so subframes) or number of OFDM symbols.

In an example, the value X' is measured from the end of TCI-DCI decoding (i.e., the last symbol carrying TCI-DCI) and the start of UL-DCI reception (i.e., the first symbol carrying UL-DCI), or the value X' is determined as the first slot that is at least P' ms or Q' symbols after the TCI-DCI with the common beam indication, where P' or Q' can be fixed, or configured, or determined/configured based on UE capability reporting). Likewise, the value $K_0$' is measured from the end of UL-DCI decoding (i.e., the last symbol carrying UL-DCI) and the start of PUSCH transmission (i.e., the first symbol carrying PUSCH). The unit of X', and $K_0$' is assumed to be in terms of time slots (so subframes) or number of OFDM symbols.

In an example, the value of X and/or X' is set/determined based on the UE's processing restriction (i.e., the processing latency) or capability. When a new beam (TCI state) is indicated via TCI-DCI, it can be used for the reception of DL-DCI or UL-DCI not earlier than X or X' time (slots or subframes or OFDM symbols) where X and X' are subject to (or determined/configured based on) the UE capability.

In one example, a UE is configured/triggered with a PUCCH transmission (e.g., for the HARQ-ACK feedback) that can be associated with a DL (e.g., PDSCH) reception, which is triggered (or scheduled) by DL-DCI. In this case, the TCI state (beam) for the PUCCH transmission is indicated/updated via TCI-DCI.

When the PDCCH carrying the TCI-DCI is associated with (configured) with a HARQ-ACK (or ACK/NACK) feedback (e.g., via a PUCCH transmission) indicating that the UE receives the updated common beam, then the beam application time may include the time between the PDCCH reception (either from the start or the end of PDCCH reception) and the corresponding PUCCH transmission (either from the start or the end of PUCCH transmission), i.e., X (or X')=$Y_1$+$Y_2$ where $Y_1$=the time between PDCCH reception and PUCCH transmission, and $Y_2$=the time between PUCCH transmission and DL-DCI (or UL-DCI) reception. Alternatively, the beam application time equals $Y_2$. In this case, the TCI state (beam) for the PUCCH transmission can be the latest (previously) beam that is indicated via TCI-DCI prior to the new/updated TCI state in the current slot.

The beam (or TCI state) to receive TCI-DCI in slot N can be the beam (or TCI state) indicated via the latest TCI-DCI in an earlier slot M<N. If the latest TCI-DCI is not received or is not configured, then a default beam can be used. For instance, the default beam for PDCCH reception in the 3GPP NR Specification can be used. Alternatively, the beam (or TCI state) to receive TCI-DCI can be the beam to receive a DL channel and/or DL RS in an earlier slot M<N. Alternatively, the beam (or TCI state) to receive TCI-DCI can be associated with the beam to transmit a UL channel and/or UL RS in an earlier slot M<N. Alternatively, the beam (or TCI) to receive TCI-DCI can be associated with a beam used to receive an SSB associated with the most recent random access procedure, e.g., random access procedure not initiated by a PDCCH order that triggers a contention-free random access procedure. Alternatively, the beam (or TCI) to receive TCI-DCI can be associated with a beam used to receive a CSI-RS associated with the most recent random access procedure, e.g., random access procedure not initiated by a PDCCH order that triggers a contention-free random access procedure. Optionally, instead of using a default beam for receiving TCI-DCI in slot N, the beam (or TCI state) for receiving the TCI-DCI can be signaled via MAC CE. For example, the mechanism supported in the 3GPP NR Specification for updating the TCI state of PDCCH can be reused to update the TCI state (beam) for receiving the TCI-DCI.

At least one of the following examples can be used to determine the value of X and $K_0$ and X' and $K_0$'.

Example I.8.1 through example I.8.5 in which the values of X and $K_0$ are set are analogous to example I.1.1 through example I.1.5 in embodiment I.1; and X' and $K_0$' are set are analogous to example I.4.1 through example I.4.5 in embodiment I.4.

In one example I.8.6, the value of X and/or X' is not configured, used, and/or set in a particular manner due to the (aperiodic) nature of the DCI signaling (TCI-DCI and/or UL-DCI/DL-DCI). Here, the UE monitors the presence of TCI-DCI as well as UL-DCI/DL-DCI in each slot/subframe by detecting the presence of the associated IDs (such as C-RNTI or group-RNTI or TCI-RNTI). In this case, the location of the pertinent TCI-DCI can be in any slot relative to the location of the UL-DCI/DL-DCI. The applicability of the TCI state signaled in the TCI-DCI can be determined from its location relative to UL-DCI/DL-DCI, e.g., to ensure sufficient time for decoding the TCI-DCI so that the TCI state is applicable to some following UL-DCI(s)/DL-DCI(s). For example, the UE assumes a minimum TCI state (beam) switching time (in number of slots/subframes or ODFM symbols) from the end of TCI-DCI decoding (i.e., the last symbol carrying TCI-DCI) and the start of UL-TCI/DL-DCI reception (i.e., the first symbol carrying UL-DCI/DL-DCI). In one example, this switching time is reported by the UE in its capability signaling (or is fixed or is configured to the UE).

In any of the previously described and following examples and embodiments associated with X'=0 and/or X=0, the methods can stand alone and, therefore, be implemented without the use of any offset parameter X and/or X'. In other words, any of such examples or embodiments can be utilized without any parameterization of X and/or X', or setting an offset parameter (such as X and/or X') to be 0.

Figure 19:
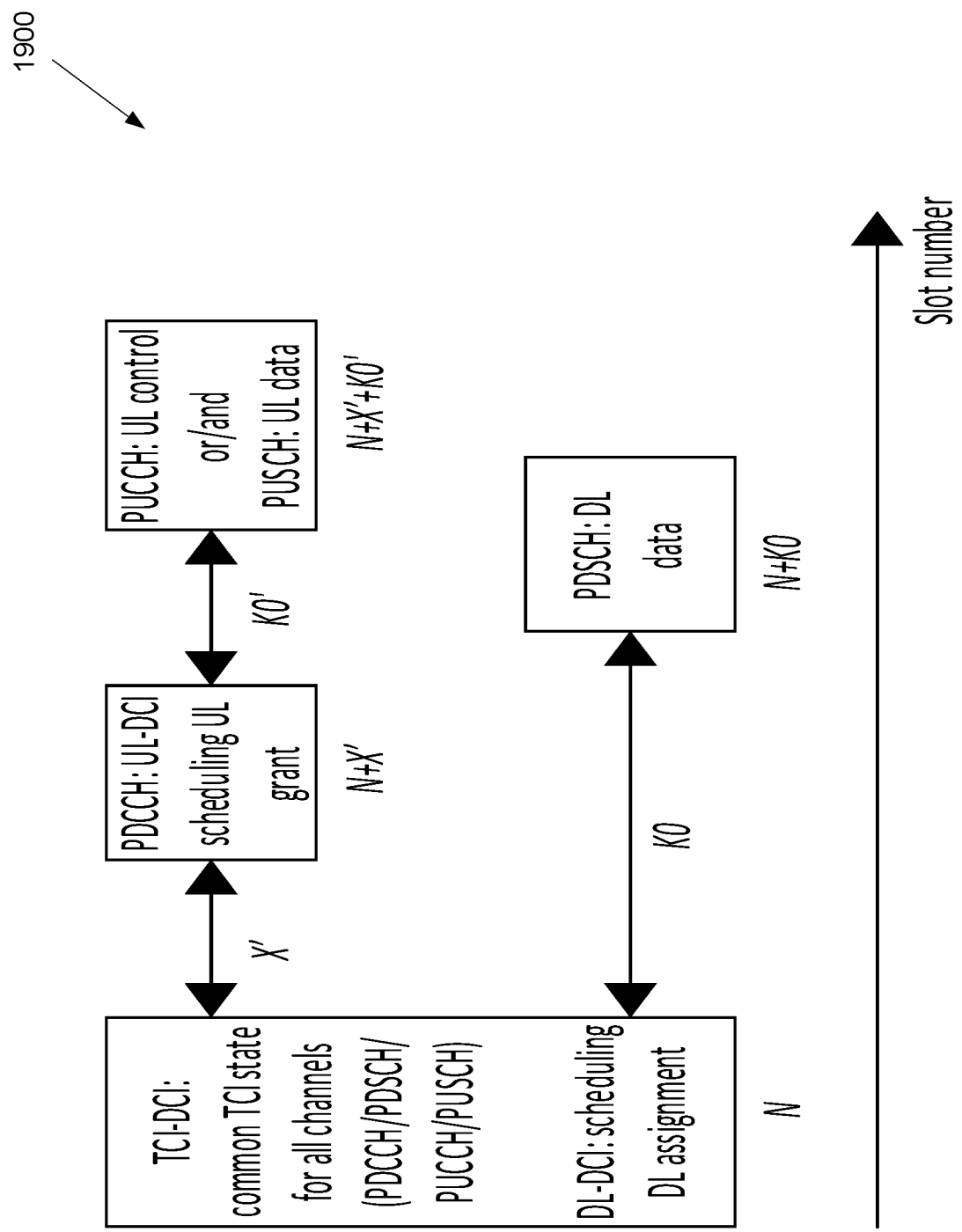
FIG. 19 illustrates an example of receiving TCI-DCI and DL-DCI in the same slot or subframe according to embodiments of the present disclosure.

FIG. 19 illustrates an example of receiving TCI-DCI and DL-DCI in the same slot or subframe 1900. The example of receiving TCI-DCI and DL-DCI in the same slot or subframe 1900 illustrated in FIG. 19 is for illustration only. FIG. 19 does not limit the scope of this disclosure to any particular implementation of the example of receiving TCI-DCI and DL-DCI in the same slot or subframe 1900.

In at least one of the above embodiments (or examples), as shown in FIG. 19, when the value of the parameter X=0 and X'>0, i.e., the UE is configured to receive TCI-DCI and DL-DCI in the same slot (or subframe) N. The UE receives/decodes TCI-DCI and DL-DCI in slot (or subframe) N, and obtains the indicated beam (TCI state) from TCI-DCI and scheduling information for the DL assignment from DL-DCI. The UE then receives DL data (PDSCH) according to the DL assignment using the indicated beam in slot $N+K_0$.

Figure 20:
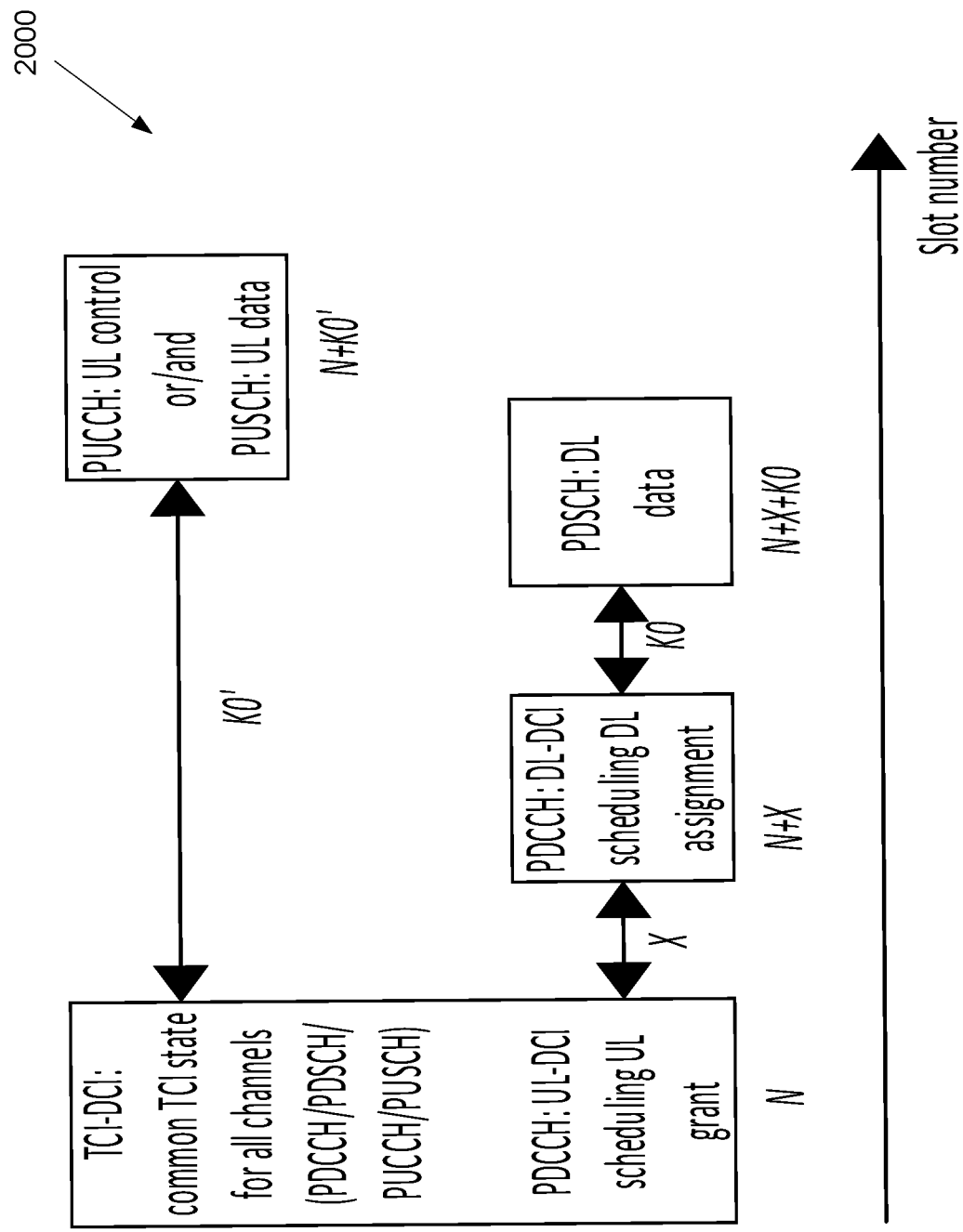
FIG. 20 illustrates an example of receiving TCI-DCI and UL-DCI in the same slot or subframe according to embodiments of the present disclosure.

FIG. 20 illustrates an example of receiving TCI-DCI and UL-DCI in the same slot or subframe 2000. The example of receiving TCI-DCI and UL-DCI in the same slot or subframe 2000 illustrated in FIG. 20 is for illustration only. FIG. 20 does not limit the scope of this disclosure to any particular implementation of the example of receiving TCI-DCI and UL-DCI in the same slot or subframe 2000.

In at least one of the above embodiments (or examples), as shown in FIG. 20, when the value of the parameter X'=0 and X>0, i.e., the UE is configured to receive TCI-DCI and UL-DCI in the same slot (or subframe) N. The UE receives/decodes TCI-DCI and UL-DCI in slot (or subframe) N', and obtains the indicated beam (TCI state) from TCI-DCI and scheduling information for the UL grant from UL-DCI. The UE then transmits UL control (PUCCH) and/or UL data (PUSCH, according to the UL grant) using the indicated beam in slot $N'+K_0'$.

Figure 21:
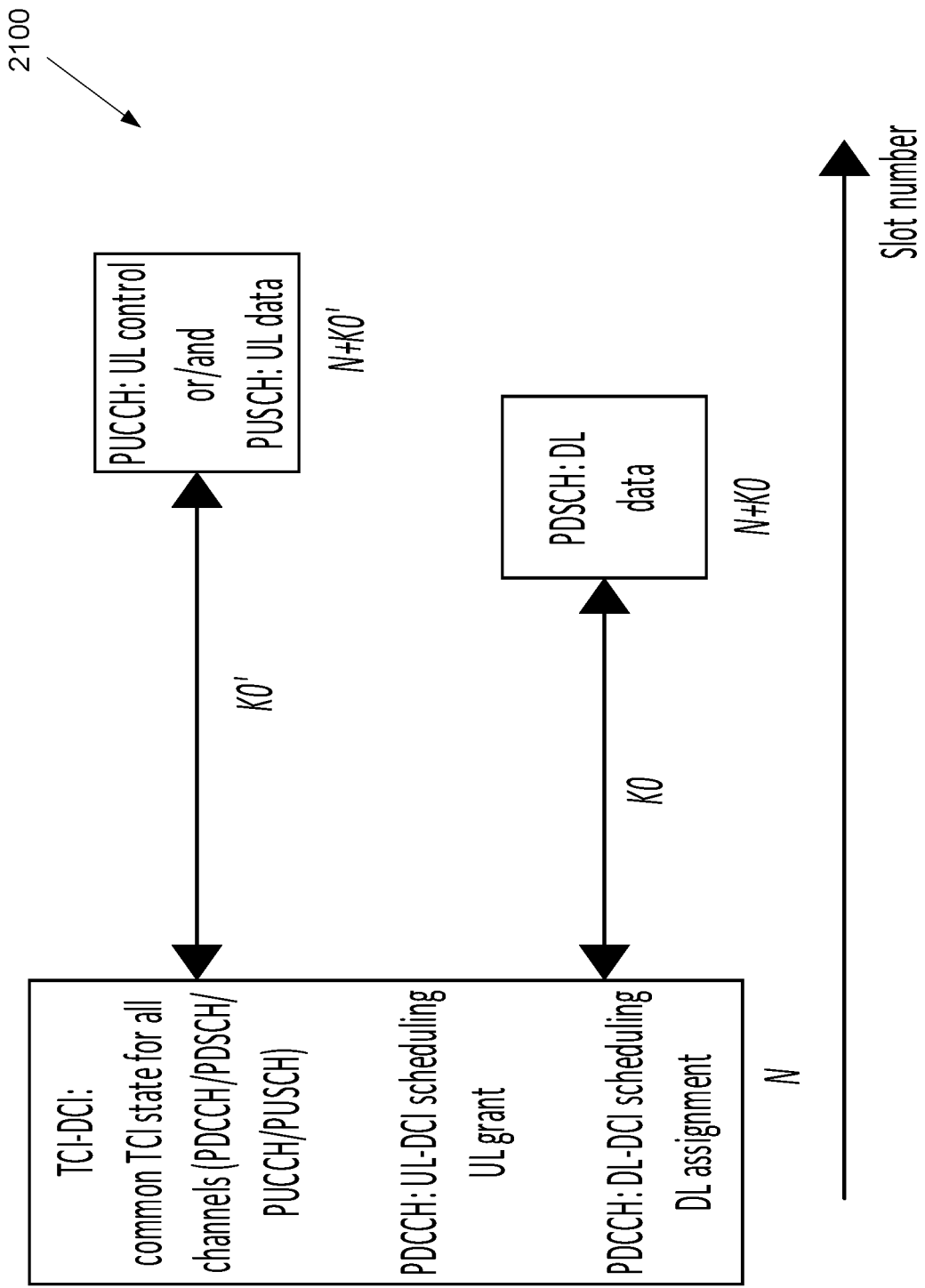
FIG. 21 illustrates an example of receiving TCI-DCI, UL-DCI, and DL-DCI in the same slot or subframe according to embodiments of the present disclosure.

FIG. 21 illustrates an example of receiving TCI-DCI, UL-DCI, and DL-DCI in the same slot or subframe 2100. The example of receiving TCI-DCI, UL-DCI, and DL-DCI in the same slot or subframe 2100 illustrated in FIG. 21 is for illustration only. FIG. 21 does not limit the scope of this disclosure to any particular implementation of the example of receiving TCI-DCI, UL-DCI, and DL-DCI in the same slot or subframe 2100.

In at least one of the above embodiments (or examples), as shown in FIG. 21, when the value of the parameter X=X'=0, i.e., the UE is configured to receive TCI-DCI, UL-DCI, and DL-DCI in the same slot (or subframe) N. The UE receives/decodes TCI-DCI, DL-DCI, and UL-DCI in slot (or subframe) N, and obtains the indicated beam (TCI state) from TCI-DCI, scheduling information for the DL assignment from DL-DCI, and scheduling information for the UL grant from UL-DCI. The UE then receives DL data (PDSCH) according to the DL assignment using the indicated beam in slot $N+K_0$ and transmits UL control (PUCCH) and/or UL data (PUSCH, according to the UL grant) using the indicated beam in slot $N'+K_0'$.

In the above three examples, since TCI-DCI and DL-DCI (and/or UL-DCI) are received in the same slot, the UE can't use the beam indicated via TCI-DCI in the current slot for the reception of DL control (PDCCH carrying DL-DCI (and/or UL-DCI)). The beam (or TCI state) to receive TCI-DCI and DL-DCI (and/or UL-DCI) in slot N can be the beam indicated via the latest TCI-DCI in an earlier slot M<N or, optionally, the latest TCI state applicable to the DL-DCI (and/or UL-DCI) signaled via other means. If the latest TCI-DCI is not received or is not configured, then a default beam can be used. For instance, the default beam for PDCCH reception in the 3GPP NR Specification can be used. Alternatively, the beam (or TCI state) to receive TCI-DCI and DL-DCI (and/or UL-DCI) can be the beam to receive a DL channel and/or DL RS in an earlier slot M<N. Alternatively, the beam (or TCI state) to receive TCI-DCI and DL-DCI (and/or UL-DCI) can be associated with the beam to transmit a UL channel and/or UL RS in an earlier slot M<N. Optionally, instead of using a default beam for receiving TCI-DCI and DL-DCI (and/or UL-DCI) in slot N, the beam (or TCI state) for receiving the TCI-DCI can be signaled via MAC CE. For example, the mechanism supported in the 3GPP NR Specification for updating the TCI state of PDCCH can be reused to update the TCI state (beam) for receiving the TCI-DCI.

At least one of the following examples can be applicable when the TCI-DCI and DL-DCI (and/or UL-DCI) are received in the same slot.

In one example I.8.7, TCI-DCI and DL-DCI (and/or UL-DCI) correspond to (or functionally combined into) a single (joint) DCI including all DCI fields of both TCI-DCI and DL-DCI (and/or UL-DCI). In one example, this joint DCI is labelled as TCI-DCI. In one example, this joint DCI is labelled as DL-DCI (e.g., format 1_0, 1_1, or 1_2 in NR specification). In one example, this joint DCI is labelled as UL-DCI (e.g., format 0_0, 0_1, or 0_2 in NR specification).

In one example, when a UL-DCI is used for common beam indication for both DL and UL, the UL-DCI format can include one or both of common beam (TCI state) and UL grant. At least one of the following examples can be used/configured.

In example I.8.7.1, the UE decodes the UL-DCI and determines whether only one or both of common beam (TCI state) and UL grant are included. For example, when the TCI state field in the DCI takes a value (e.g., 0), it indicates that the TCI state (or common beam) is not indicated (or being absent). Likewise, when a parameter in the scheduling assignment field in the DCI takes a value (e.g., 0), it indicates that there is no UL grant (absent).

In example I.8.7.2, the information whether only one or both of common beam (TCI state) and UL grant are included can be configured via RRC or activated via MAC CE.

In one example, when a UL-DCI is used for common beam indication for both DL and UL, the DL-DCI format can include one or both of common beam (TCI state) and DL assignment. At least one of the following examples can be used/configured.

In example I.8.7.1A, the UE decodes the DL-DCI and determines whether only one or both of common beam (TCI state) and DL assignment are included. For example, when the TCI state field in the DCI takes a value (e.g., 0), it indicates that the TCI state (or common beam) is not indicated (or being absent). Likewise, when a parameter in the scheduling assignment field in the DCI takes a value (e.g., 0), it indicates that there is no DL assignment (absent).

In example I.8.7.2A, the information whether only one or both of common beam (TCI state) and DL assignment are included can be configured via RRC or activated via MAC CE.

In one example I.8.8, TCI-DCI can be separate from DL-DCI (and/or UL-DCI), but they are in the same slot. The rest of the details are analogous to example I.1.8 (and/or I.4.8).

In any of the previously described and following examples and embodiments associated with X=0, the methods can stand alone and, therefore, be implemented without the use of any offset parameter X. In other words, any of such examples or embodiments can be utilized without any parameterization of X, or setting an offset parameter (such as X) to be 0.

In any of the previously described and following examples and embodiments associated with X'=0, the methods can stand alone and, therefore, be implemented without the use of any offset parameter X'. In other words, any of such examples or embodiments can be utilized without any parameterization of X', or setting an offset parameter (such as X') to be 0.

In one embodiment I.9 a UE can be configured with a higher layer parameter (and/or MAC CE and/or DL-DCI field) to enable the TCI state (beam) indication via TCI-DCI. For example, a UE can be configured to derive its TCI state update from TCI-DCI and/or DL-DCI (and/or UL-DCI) depending on the configuration for TCI-DCI and/or DL-DCI (and/or UL-DCI). The rest of the details are analogous to the corresponding embodiment I.2 for DL and embodiment I.5 for UL.

In one example I.9.1, when the offset parameter X and/or X' is used or configured, the resulting UE procedure can be dependent on the value of X and/or X'. For example, when X=0, TCI-DCI is absent (not received and/or not configured) (or TCI-DCI and DL-DCI correspond to (or functionally combined into) a single (joint) DCI cf. example I.1.7) and the TCI state indication/update is present and signaled/received in the DL-DCI (and is used for the reception of DL data); and when X>0, TCI-DCI is present (configured and hence can be received), and the TCI state indication/update is present and signaled/received in the TCI-DCI (and is used for the reception of both DL data associated with the DL assignment in the DL-DCI, and DL control including the DL-DCI). Likewise, for example, when X'=0, TCI-DCI is absent (not received and/or not configured) (or TCI-DCI and UL-DCI correspond to (or functionally combined into) a single (joint) DCI cf. example I.4.7) and the TCI state indication/update is present and signaled/received in the UL-DCI (and is used for the transmission of UL data); and when X>0, TCI-DCI is present (configured and hence can be received), and the TCI state indication/update is present and signaled/received in the TCI-DCI (and is used for the transmission of UL data and/or UL control).

In one example I.9.2, regardless of whether the offset parameter X and/or X' is used/configured or not, the resulting UE procedure can be based on a higher layer (RRC) parameter, e.g., tci-dci-IsPresent. When tci-dci-IsPresent is set to 'enabled', TCI-DCI is present (configured and hence can be received), and the TCI state indication/update is TCI state indication/update in the TCI-DCI (and is used for the transmission of UL data and/or UL control, and/or is used for the reception of both DL data and DL control). Otherwise, TCI-DCI is absent (not received and/or not configured) (or TCI-DCI and DL-DCI/UL-DCI correspond to (or functionally combined into) a single (joint) DCI cf. example I.1.7/I.4.7) and the TCI state indication/update is present and signaled/received in the UL-DCI (and is used for the transmission of UL data) or DL-DCI (and is used for the reception of DL data).

In one example I.9.3, regardless of whether the offset parameter X and/or X' is used/configured or not, and regardless of whether a higher-layer parameter controlling the presence of TCI-DCI (e.g., tci-dci-IsPresent) is used/configured or not, the resulting UE procedure can (also) be based on the higher layer parameter tci-PresentInDCI in PDSCH-Config or PUSCH-Config (which controls the presence of DL-DCI or UL-DCI). For example, when the parameter tci-dci-IsPresent is 'enabled' and tci-PresentInDCI is also 'enabled', both the TCI-DCI and UL-DCI (and/or DL-DCI) are present (configured and hence can be received). In this case, the TCI state indication/update applicable for decoding the DL-DCI and/or UL-DCI (in the pertinent PDCCH) is signaled/received in the latest (most recent) TCI-DCI while the TCI state indication/update applicable for decoding the assigned DL data in the pertinent PDSCH (associated with the DL assignment in the DL-DCI) is signaled/received in the latest (most recent) DL-DCI; and/or, the TCI state indication/update applicable for transmission of the UL data in the pertinent PUSCH (associated with the UL grant in the UL-DCI) is signaled/received in the latest (most recent) UL-DCI. When the parameter tci-dci-IsPresent is 'enabled' and tci-PresentInDCI is not 'enabled', TCI-DCI is present (configured and hence can be received), and the TCI state indication/update is TCI state indication/update in the TCI-DCI (and is used for the transmission of both UL data associated with the UL grant in the UL-DCI, and UL control, and/or is used for the reception of both DL data associated with the DL assignment in the DL-DCI, and DL control including the DL-DCI).

In one example I.9.4, regardless of whether the offset parameter X and/or X' is used/configured or not, the resulting UE procedure can be based on a higher layer (RRC) parameter and/or MAC CE activation.

In one example I.9.5, regardless of whether the offset parameter X and/or X' is used/configured or not, the resulting UE procedure can be based on a system information (i.e., for all UEs in a cell).

In one embodiment I.10, a UE can be configured with semi-persistent scheduling (SPS) for DL data (PDSCH), and/or configured with configured grant Type 1 or Type 2 PUSCH transmission. The details of SPS for PDSCH reception are according to embodiment I.3, and that for configured grant Type 1 or Type 2 PUSCH transmission are according to embodiment I.6.

In one example I.10.1, a UE is configured to receive a dedicated DCI (TCI-DCI) indicating the common beam (TCI state) for (a) the reception of DL control (PDCCH) and if activated by the received PDCCH, also for the reception of DL data (PDSCH), and/or (b) the transmission of UL control (PUCCH) and/or data (PUSCH) if activated by the received PDCCH (configured grant Type 2 PUSCH). The details for (a) is according to example I.3.1, and that for (b) is according to I.6.1.

In one example I.10.2, a UE is configured to receive a dedicated DCI (TCI-DCI) via PDCCH, which includes the common beam (TCI state) for the reception of PDCCH in later slot(s) and, if activated by the received PDCCH, the common beam is also used for (a) the reception of DL data (PDSCH) scheduled by SPS and/or (b) the transmission of UL data (PUSCH) (for the configured grant Type 2 PUSCH transmission). The details for (a) is according to example I.3.2, and that for (b) is according to I.6.2.

In one example I.10.3, a UE is configured to receive a dedicated DCI (e.g., TCI-DCI) via PDCCH, which includes (a) a field for the common beam (TCI state) and/or (b) another field for the activation/release of PDSCH reception (according to the configured SPS) and/or PUSCH transmission (configured grant Type 2 PUSCH). When PDSCH reception and/or PUSCH transmission is activated by field (b), the UE can be indicated/updated with a new (TCI state) beam for PDSCH reception and/or PUSCH transmission (with or without PDCCH reception) using the field (a). Once PDSCH reception and/or PUSCH transmission is not activated or released by field (b), the UE can be indicated/updated with a new (TCI state) beam for PDCCH reception and/or PUSCH transmission only using the field (a).

In one example I.10.4, a UE is configured to receive a dedicated DCI (TCI-DCI) indicating the common beam (TCI state) for (a) the reception of DL control (PDCCH) and if activated by the received PDCCH, also for the reception of DL data (PDSCH), and/or (b) the transmission of UL control (PUCCH) and/or data (PUSCH). The details for (a) is according to example I.3.1. For (b), the UE receives (e.g., a TCI-DCI format) and decodes TCI-DCI in slot (or subframe) N', and uses the indicated beam (TCI state) to transmit UL control (PUCCH) (e.g., periodic PUCCH or semi-persistent PUCCH) and/or data (PUSCH) (e.g., configured grant Type 1) starting in the same (slot N') or later slot(s). The details for (b) is according to I.6.3.

In one example I.10.5, a UE can be configured to receive a dedicated DCI (TCI-DCI) indicating the common beam (TCI state) for the transmission of PDCCH-triggered contention-free random access (CFRA) preambles, such PDCCH is known as a PDCCH order, which can be a DCI format 1_0 with the "frequency domain resource assignment" field set to all ones as described in TS 38.212. The rest of the details are according to embodiment I.7, except that the functionality of RACH-TCI-DCI is included in TCI-DCI. Note that in this example, TCI-DCI indicates a common beam for (a) DL control and DL data and/or (b) UL data and UL control and/or (c) PRACH.

Additional Embodiments on Beam Application Time

In embodiment II, a UE is configured with a beam indication comprising either a joint DL/UL TCI for both DL reception and UL transmission (of control and/or data channels), or two separate TCIs, UL-TCI and DL-TCI, for UL transmission and DL reception, respectively, where the beam indication indicates M beam(s) for DL reception and/or N beam(s) for UL transmission. The definition of DL-TCI, UL-TCI and joint DL/UL TCI are as follows.

For M=1:
DL TCI: The source reference signal(s) (analogous to Rel.15, two, if qcl_Type2 is configured in addition to qcl_Type1) in the DL TCI provides QCL information at least for UE-dedicated reception on PDSCH and all of CORESETs in a CC.

For N=1:
UL TCI: The source reference signal in the UL TCI provides a reference for determining UL TX spatial filter at least for dynamic-grant/configured-grant based PUSCH and all of dedicated PUCCH resources in a CC.

For M=N=1:
Joint DL/UL TCI: A TCI refers to at least a common source reference RS used for determining both the DL QCL information and the UL TX spatial filter.
Separate DL/UL TCI: The DL TCI and UL TCI are distinct (therefore, separate).

For M>1:
DL TCI: Each of the M source reference signals (or 2M, if qcl_Type2 is configured in addition to qcl_Type1) in the M DL TCIs provides QCL information at least for one of the M beam pair links for UE-dedicated receptions on PDSCH and/or subset of CORESETs in a CC.

For N>1:
UL TCI: Each of the N source reference signals in the N UL TCIs provide a reference for determining UL TX spatial filter at least for one of the N beam pair links associated with dynamic-grant(s)/configured-grant(s) based PUSCH, and/or subset of dedicated PUCCH resources in a CC.

For M>1 and/or N>1:
Joint DL/UL TCI: A TCI refers to at least a common source reference RS used for determining both the DL QCL information and the UL TX spatial filter. In this case, M=N.
Separate DL/UL TCI: The M DL TCIs and N UL TCIs are distinct (therefore, separate).

In embodiment II.1, the parameters X and X' (as described in this disclosure) are determined/configured according to at least one of the following examples.

In one example II.1.1, X=X', where X=B or X≥B, where B is the beam application time (for DL or UL or a common value for both DL and UL). At least one of the following examples is used/configured.
In one example, X is fixed.
In one example, X is configured via higher layer RRC and/or MAC CE and/or DCI based signaling.
In one example, the value of X is determined (fixed or configured) subject to the beam application time or the minimum BAT value (which can be reported by the UE).

In one example 11.1.2, X and X' can be different, where X=B or X≥B, where B is the beam application time (for DL or a common value for both DL and UL), and likewise X'=B' or X'≥B', where B' is the beam application time (for UL or a common value for both DL and UL). At least one of the following examples is used/configured.
In one example, X and X' are fixed.
In one example, X' is determined based on the value of X, where X is either fixed, or configured via higher layer RRC and/or MAC CE and/or DCI based signaling, or the value of X is determined (fixed or configured) subject to the beam application time or the minimum BAT value (which can be reported by the UE). The value of X' is determined based on the value of X, where the relation between X and X' can be fixed or determined implicitly (e.g., based on a relation) or explicitly (e.g., based on configuration).
In one example, X is determined based on the value of X', where X' is either fixed, or configured via higher layer RRC and/or MAC CE and/or DCI based signaling, or the value of X' is determined (fixed or configured) subject to the beam application time or the minimum BAT value (which can be reported by the UE). The value of X is determined based on the value of X', where the relation between X and X' can be fixed or determined implicitly (e.g., based on a relation) or explicitly (e.g., based on configuration).
In one example, X and X' are configured (jointly or separately) via higher layer RRC and/or MAC CE and/or DCI based signaling. This configuration can be subject to the beam application time or the minimum BAT value (which can be reported by the UE).

In embodiment II.2, the beam application time for DL reception and UL transmission (of data as well as control channels) is determined/configured according to at least one of the following examples.

In one example II.2.1, a single beam application time B is determined/configured via higher layer RRC and/or MAC CE and/or DCI based signaling. This configuration can be subject to the beam application time or the minimum BAT value reported by the UE in its capability reporting, i.e., the configured value is equal to or greater than the value reported by the UE.

The value B is applied to both X and X', i.e., X≥B and X'≥B. Hence, the UE uses the new beam indicated via the beam indication DCI (e.g., TCI-DCI or UL-TCI-DCI or DL-TCI-DCI) to receive DL channels and/or to transmit UL channels no earlier than the beam application time B after receiving (the first or last symbol of) the beam indication DCI. This is regardless of whether the beam indication for DL reception and UL transmission (of data as well as control channels) is via a joint DL/UL TCI or two separate TCIs, namely DL-TCI and UL-TCI.

In one example II.2.2, two beam application time values $B_1$ and $B_2$ are determined/configured via higher layer RRC and/or MAC CE and/or DCI based signaling. This configuration can be subject to the beam application time or the minimum BAT value reported by the UE in its capability reporting. At least one of the following examples is used/configured.

In one example, the value $B_1$ is applied for receiving DL channels (PDCCH and PDSCH), and the value $B_2$ is applied for transmission UL channels (PUCCH and PUSCH).

In one example, the value $B_1$ is applied for receiving DL control (PDCCH), and the value $B_2$ is applied for transmission UL control (PUCCH).

In one example, the value $B_1$ is applied when either (A) the beam indication for DL reception and UL transmission (of data as well as control channels) is via a joint DL/UL TCI or (B) the beam indication for DL reception (of data as well as control channels) is via DL-TCI; and the value $B_2$ is applied when the beam indication for UL transmission (of data as well as control channels) is via UL-TCI.

In one example, the value $B_1$ is applied when the beam indication for DL reception and UL transmission (of data as well as control channels) is via a joint DL/UL TCI, and the value $B_2$ is applied when the beam indication for DL reception and UL transmission (of data as well as control channels) is via two separate TCIs, namely DL-TCI and UL-TCI.

In one example, the value $B_1$ is applied for receiving DL channels (PDCCH and PDSCH) from and/or transmitting UL channels (PUCCH and PUSCH) to a serving cell, and the value $B_2$ is applied for receiving DL channels (e.g., PDSCH) from a non-serving cell.

In one example, the value $B_1$ is applied for receiving DL channels (PDCCH and PDSCH) and/or transmitting UL channels (PUCCH and PUSCH) when the UE doesn't need to change/switch its antenna panel(s), and the value $B_2$ is applied for receiving DL channels (PDCCH and PDSCH) and/or transmitting UL channels (PUCCH and PUSCH) when the UE needs to change/switch its antenna panel(s).

In one example II.2.3, three beam application time values $B_1$, $B_2$, and $B_3$ are determined/configured via higher layer RRC and/or MAC CE and/or DCI based signaling. This configuration can be subject to the beam application time or the minimum BAT value reported by the UE in its capability reporting. At least one of the following examples is used/configured.

In one example, the value $B_1$ is applied when the beam indication for DL reception and UL transmission (of data as well as control channels) is via a joint DL/UL TCI, the value $B_2$ is applied when the beam indication for DL reception (of data as well as control channels) is via DL-TCI, and the value $B_3$ is applied when the beam indication for UL transmission (of data as well as control channels) is via UL-TCI In embodiment II.3, the UE reports Z minimum BAT values in its capability reporting. At least one of the following examples is used/configured.

In one example II.3.1, Z=1, i.e., UE reports one minimum BAT value that is common (same) for both DL and UL channels. In one example, such reporting is conditioned on (restricted to) the UE supporting only joint DL/UL TCI for the beam indication (e.g., the UE can report this in its capability reporting). In one example, there is no additional condition or restriction for UE reporting only one minimum BAT value.

In one example II.3.2, Z=2, i.e., the UE reports two different minimum BAT values, one for DL channels and another for UL channels. In one example, such reporting is conditioned on (restricted to) the UE supporting two separate TCIs (DL-TCI and ULTCI) for the beam indication (e.g., the UE can report this in its capability reporting). In one example, there is no additional condition or restriction for UE reporting only two minimum BAT values.

In one example II.3.3, Z=2, i.e., the UE reports two different minimum BAT values, one for joint DL/UL TCI based beam indication, and another for two separate TCIs (DL-TCI and UL-TCI) based beam indication. In one example, such reporting is conditioned on (restricted to) the UE supporting both joint DL/UL TCI and separate TCIs for the beam indication (e.g., the UE can report this in its capability reporting). In one example, there is no additional condition or restriction for UE reporting only one minimum BAT value.

In one example II.3.4, Z=2, i.e., the UE reports two different minimum BAT values, one value for joint DL/UL TCI based beam indication and DL-TCI based beam indication (for DL channels), and another value for UL-TCI based beam indication (for UL channels). In one example, such reporting is conditioned on (restricted to) the UE supporting both joint DL/UL TCI and separate TCIs for the beam indication (e.g., the UE can report this in its capability reporting). In one example, there is no additional condition or restriction for UE reporting only one minimum BAT value.

In one example II.3.5, Z=2, i.e., the UE reports two different minimum BAT values, one value for joint DL/UL TCI based beam indication and UL-TCI based beam indication (for UL channels), and another value for DL-TCI based beam indication (for DL channels). In one example, such reporting is conditioned on (restricted to) the UE supporting both joint DL/UL TCI and separate TCIs for the beam indication (e.g., the UE can report this in its capability reporting). In one example, there is no additional condition or restriction for UE reporting only one minimum BAT value.

In one example II.3.6, Z=3, i.e., the UE reports three different minimum BAT values, a first value for joint DL/UL TCI based beam indication, a second value for DL-TCI based beam indication (for DL channels), and a third value for UL-TCI based beam indication (for UL channels). In one example, such reporting is conditioned on (restricted to) the UE supporting both joint DL/UL TCI and separate TCIs for the beam indication (e.g., the UE can report this in its capability reporting). In one example, there is no additional condition or restriction for UE reporting only one minimum BAT value.

In one example II.3.7, the value of Z depends on the number of antenna port groups, N. (or number of panels) at the UE. In one example, $Z=N_g$, i.e., the UE reports one minimum BAT value for each antenna port group (or antenna panel). In one example, Z=2, i.e., the UE reports two minimum BAT values, one value for the case when the UE doesn't need to change its antenna panel(s) for DL reception and/or UL transmission, and another value for the case when the UE needs to change its antenna panel(s) for DL reception and/or UL transmission.

In one example II.3.8, Z=1, i.e., the UE reports one different minimum BAT value, for the case when the beam indication is via joint DL-UL TCI, and Z=2, i.e., the UE reports two different minimum BAT values, for the case when the beam indication is via separate TCIs (DL-TCI and UL-TCI). In one example, such reporting depends on whether the UE supports the joint DL/UL TCI or two separate TCIs or both. For example, Z=1 when the UE supports only joint DL/UL TCI or only separate TCIs, and Z=2 when the UE supports both.

In one example II.3.9, Z=2, i.e., the UE reports two different minimum BAT values, one value for receiving DL channels (PDCCH and PDSCH) from and/or transmitting UL channels (PUCCH and PUSCH) to a serving cell, and another value for receiving DL channels (e.g., PDSCH) from a non-serving cell.

In embodiment II.4, a UE is configured to receive a configuration information (e.g., via RRC and/or MACE CE) including P>1 BAT values, and a set of TCI states. The UE, based on the configuration information, is further configured to receive (PDCCH with) a DCI which includes a TCI state update, where the DCI can be a DL-DCI or UL-DCI or TCI-DCI or DL-TCI-DCI or UL-TCI-DCI (as described in this disclosure). The UE receives the PDCCH and decodes the DCI to obtain the TCI state update. The UE then determines an updated/new beam based on the TCI state update and applies the updated/new beam for DL reception and/or UL transmission, at least after a time duration from receiving the TCI state update indication, where the time duration is determined based on the P BAT values.

In one example, the UE transmits a capability information including Z minimum beam application time (BAT) value(s), where Z>=1, and the P BAT values (that are configured) are based on the Z min BAT values.

In one example, a TCI state refers to at least one source reference signal (RS) with a corresponding quasi co-location (QCL) type, and the QCL type is a type of a QCL property associated with the at least one source RS; and the updated/new beam refers to the QCL type being set to a spatial property used to receive or transmit the at least one source RS included in the TCI state update.

In one example, Z=1, i.e., a common value is reported (by the UE) for all P BAT values, i.e., each of the P BAT values is equal to or greater than the common minimum BAT value included in the capability information.

In one example, Z=P, i.e., one value is reported (by the UE) for each of the P BAT values, i.e., each of the P BAT values is equal to or greater than the corresponding minimum BAT value included in the capability information.

Any of the above variation embodiments can be utilized independently or in combination with at least one other variation embodiment.

Figure 22:
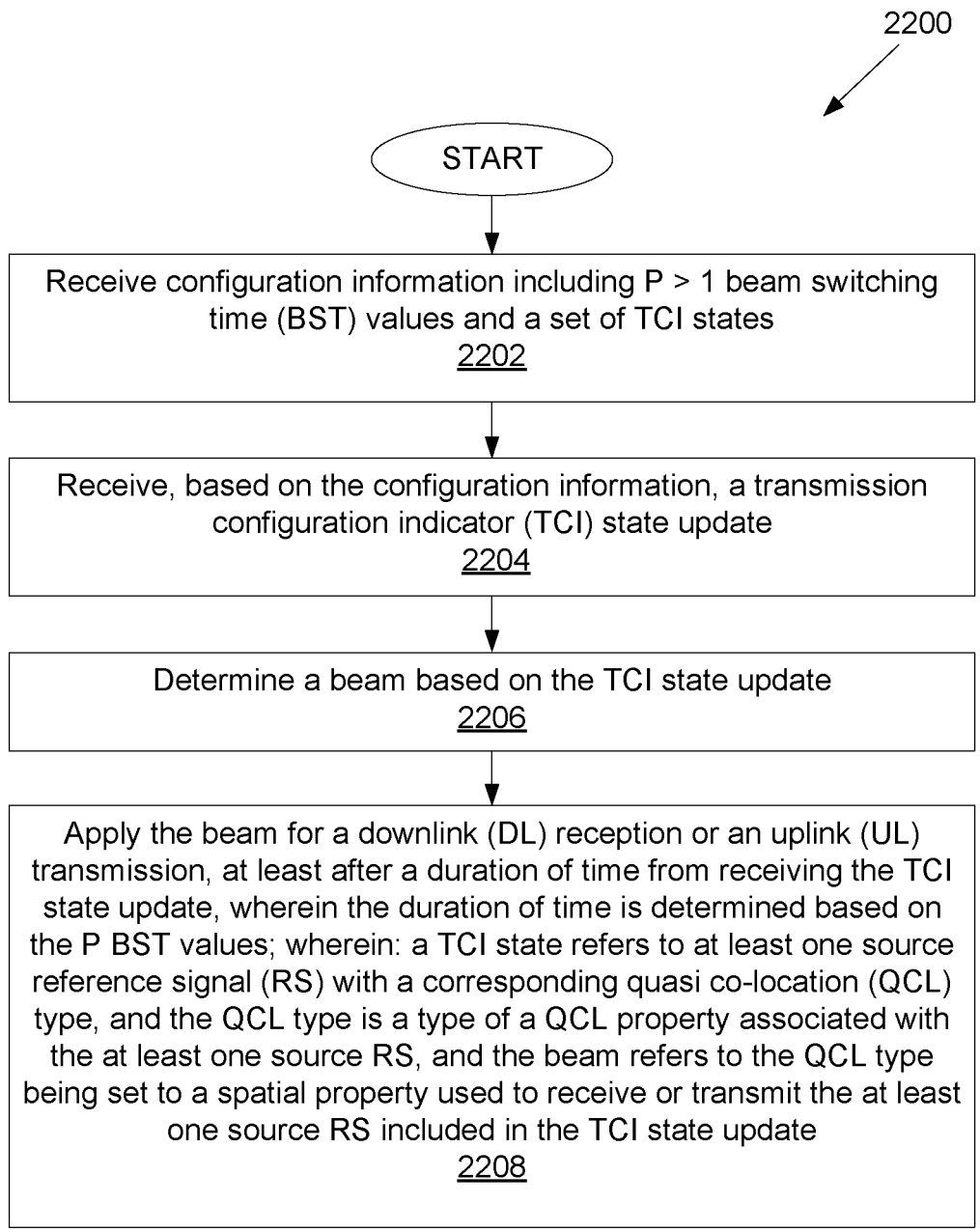
FIG. 22 illustrates a flow chart of a method for operating a UE according to embodiments of the present disclosure.

FIG. 22 illustrates a flow chart of a method 2200 for operating a user equipment (UE), as may be performed by a UE such as UE 116, according to embodiments of the present disclosure. The embodiment of the method 2200 illustrated in FIG. 22 is for illustration only. FIG. 22 does not limit the scope of this disclosure to any particular implementation.

As illustrated in FIG. 22, the method 2200 begins at step 2202. In step 2202, the UE (e.g., 111-116 as illustrated in FIG. 1) receives configuration information including P>1 beam switching time (BST) values and a set of TCI states.

In step 2204, the UE receives, based on the configuration information, a transmission configuration indicator (TCI) state update.

In step 2206, the UE determines a beam based on the TCI state update.

In step 2208, the UE applies the beam for a downlink (DL) reception or an uplink (UL) transmission, at least after a duration of time from receiving the TCI state update, wherein the duration of time is determined based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update.

In one embodiment, the UE transmits capability information including Z minimum BST values, Z≥1, and the P BST values are based on the Z minimum BST values.

In one embodiment, when Z=1, then the Z minimum BST values correspond to a single minimum BST value that is common for all of the P BST values, and the each of the P BST values is equal to or greater than the single minimum BST value.

In one embodiment, when Z=P, then the Z minimum BST values correspond to a separate minimum BST value for each of the P BST values, and the each of the P BST values is equal to or greater than the respective separate minimum BST value.

In one embodiment, when P=2, a first BST value is associated with a DL channel and a second BST value is associated with an UL channel.

In one embodiment, when P=2, a first BST value is associated with a serving cell and a second BST value is associated with non-serving cell.

In one embodiment, when P=2, a first BST value is used when the UE needs to switch its antenna panel, and a second BST value is used when the UE does not need to switch its antenna panel.

In one embodiment, when P equals a number of UE antenna panels, each of the BST values is associated with a corresponding UE antenna panel.

Figure 23:
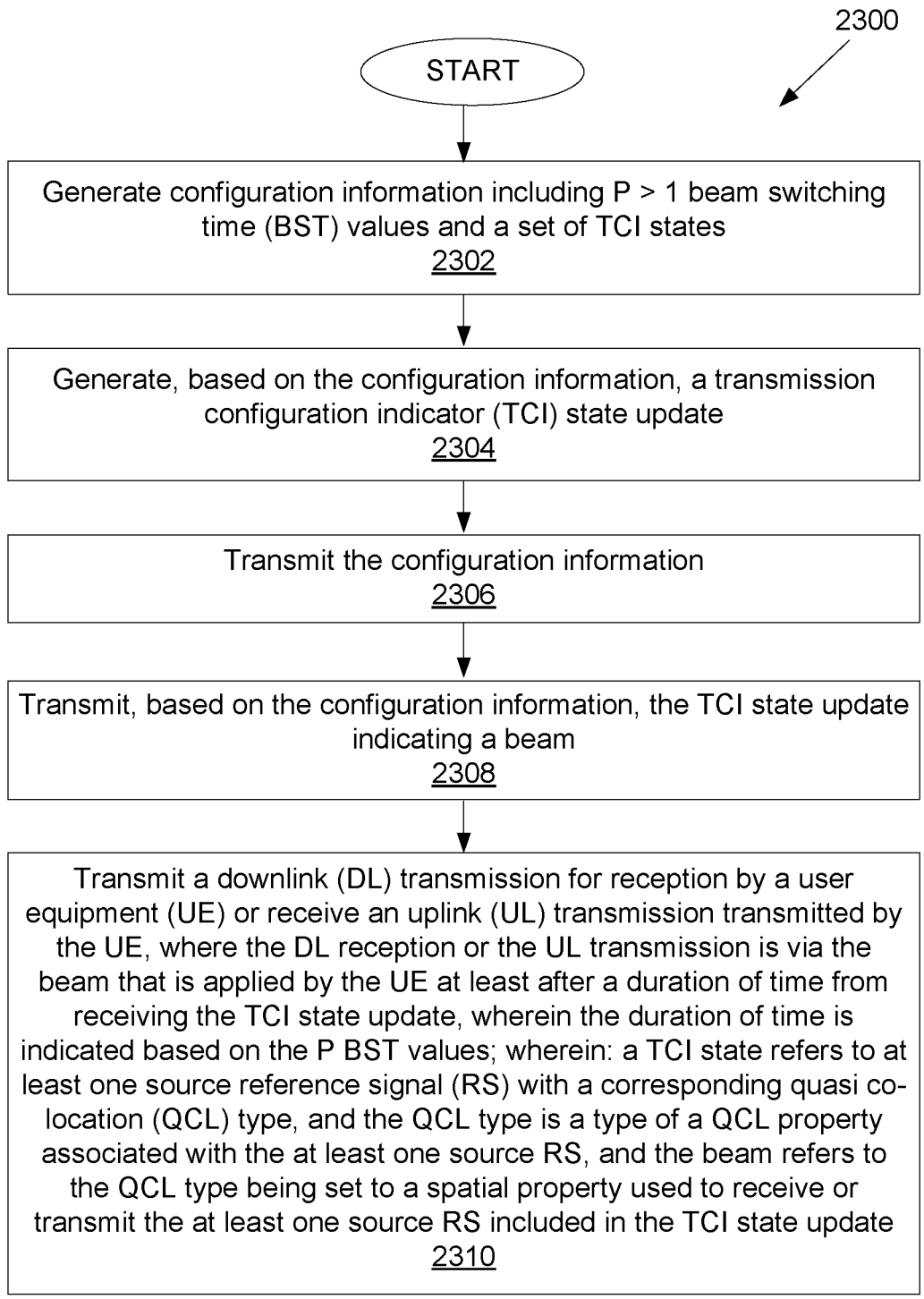
FIG. 23 illustrates a flow chart of a method for operating a BS according to embodiments of the present disclosure.

FIG. 23 illustrates a flow chart of another method 2300, as may be performed by a base station (BS) such as BS 102, according to embodiments of the present disclosure. The embodiment of the method 2300 illustrated in FIG. 23 is for illustration only. FIG. 23 does not limit the scope of this disclosure to any particular implementation.

As illustrated in FIG. 23, the method 2300 begins at step 2302. In step 2302, the BS (e.g., 101-103 as illustrated in FIG. 1), generates configuration information including P>1 beam switching time (BST) values and a set of TCI states.

In step 2304, the BS generates, based on the configuration information, a transmission configuration indicator (TCI) state update.

In step 2306, the BS transmits the configuration information.

In step 2308, the BS transmits, based on the configuration information, the TCI state update indicating a beam.

In step 2310, the BS transmits a downlink (DL) transmission for reception by a user equipment (UE) or receive an uplink (UL) transmission transmitted by the UE, where the DL reception or the UL transmission is via the beam that is applied by the UE at least after a duration of time from receiving the TCI state update, wherein the duration of time is indicated based on the P BST values; wherein: a TCI state refers to at least one source reference signal (RS) with a corresponding quasi co-location (QCL) type, and the QCL type is a type of a QCL property associated with the at least one source RS, and the beam refers to the QCL type being set to a spatial property used to receive or transmit the at least one source RS included in the TCI state update.

In one embodiment, the BS receives capability information including Z minimum BST values, Z≥1, and the P BST values are based on the Z minimum BST values.

In one embodiment, when Z=1, then the Z minimum BST values correspond to a single minimum BST value that is common for all of the P BST values, and the each of the P BST values is equal to or greater than the single minimum BST value.

In one embodiment, when Z=P, then the Z minimum BST values correspond to a separate minimum BST value for each of the P BST values, and the each of the P BST values is equal to or greater than the respective separate minimum BST value.

In one embodiment, when P=2, a first BST value is associated with a DL channel and a second BST value is associated with an UL channel.

In one embodiment, when P=2, a first BST value is associated with a serving cell and a second BST value is associated with non-serving cell.

In one embodiment, when P=2, a first BST value is used when a user equipment (UE) needs to switch its antenna panel, and a second BST value is used when the UE does not need to switch its antenna panel.

In one embodiment, when P equals a number of user equipment (UE) antenna panels, each of the BST values is associated with a corresponding UE antenna panel.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information including P>1 beam switching time (BST) values and a set of TCI states; and
receive, based on the configuration information, a transmission configuration indicator (TCI) state update; and
a processor operably coupled to the transceiver, the processor configured to:
determine a beam based on the TCI state update; and
apply the beam for a downlink (DL) reception or an uplink (UL) transmission, at least after a duration of time from receiving the TCI state update, wherein the duration of time is determined based on the P BST values;
wherein:
a TCI state refers to at least one source reference signal (RS) with a corresponding quasi co-location (QCL) type, and the QCL type is a type of a QCL property associated with the at least one source RS, and
the beam refers to the QCL type being set to a spatial property used to receive or transmit the at least one source RS included in the TCI state update.

2. The UE of claim 1, wherein:
the transceiver is further configured to transmit capability information including Z minimum BST values, Z≥1, and
the P BST values are based on the Z minimum BST values.

3. The UE of claim 2, wherein when Z=1, then the Z minimum BST values correspond to a single minimum BST value that is common for all of the P BST values, and each of the P BST values is equal to or greater than the single minimum BST value.

4. The UE of claim 2, wherein when Z=P, then the Z minimum BST values correspond to a separate minimum BST value for each of the P BST values, and the each of the P BST values is equal to or greater than the respective separate minimum BST value.

5. The UE of claim 1, wherein when P=2, a first BST value is associated with a DL channel and a second BST value is associated with an UL channel.

6. The UE of claim 1, wherein when P=2, a first BST value is associated with a serving cell and a second BST value is associated with non-serving cell.

7. The UE of claim 1, wherein when P=2, a first BST value is used when the UE needs to switch its antenna panel, and a second BST value is used when the UE does not need to switch its antenna panel.

8. The UE of claim 1, wherein when P equals a number of UE antenna panels, each of the BST values is associated with a corresponding UE antenna panel.

9. A base station (BS) comprising:
a processor configured to:
generate configuration information including P>1 beam switching time (BST) values and a set of TCI states, and
generate, based on the configuration information, a transmission configuration indicator (TCI) state update; and
a transceiver operably coupled to the processor, the transceiver configured to:
transmit the configuration information,
transmit, based on the configuration information, the TCI state update indicating a beam; and
transmit a downlink (DL) transmission for reception by a user equipment (UE) or receive an uplink (UL) transmission transmitted by the UE, where the DL reception or the UL transmission is via the beam that is applied by the UE at least after a duration of time from receiving the TCI state update, wherein the duration of time is indicated based on the P BST values;

wherein:
- a TCI state refers to at least one source reference signal (RS) with a corresponding quasi co-location (QCL) type, and the QCL type is a type of a QCL property associated with the at least one source RS, and
- the beam refers to the QCL type being set to a spatial property used to receive or transmit the at least one source RS included in the TCI state update.

10. The BS of claim 9, wherein:
the transceiver is further configured to receive capability information including Z minimum BST values, $Z \geq 1$, and
the P BST values are based on the Z minimum BST values.

11. The BS of claim 10, wherein when Z=1, then the Z minimum BST values correspond to a single minimum BST value that is common for all of the P BST values, and each of the P BST values is equal to or greater than the single minimum BST value.

12. The BS of claim 10, wherein when Z=P, then the Z minimum BST values correspond to a separate minimum BST value for each of the P BST values, and the each of the P BST values is equal to or greater than the respective separate minimum BST value.

13. The BS of claim 9, wherein when P=2, a first BST value is associated with a DL channel and a second BST value is associated with an UL channel.

14. The BS of claim 9, wherein when P=2, a first BST value is associated with a serving cell and a second BST value is associated with non-serving cell.

15. The BS of claim 9, wherein when P=2, a first BST value is used when the user equipment (UE) needs to switch its antenna panel, and a second BST value is used when the UE does not need to switch its antenna panel.

16. The BS of claim 9, wherein when P equals a number of user equipment (UE) antenna panels, each of the BST values is associated with a corresponding UE antenna panel.

17. A method for operating a user equipment (UE), the method comprising:
receiving configuration information including P>1 beam switching time (BST) values and a set of TCI states;
receiving, based on the configuration information, a transmission configuration indicator (TCI) state update;
determining a beam based on the TCI state update; and
applying the beam for a downlink (DL) reception or an uplink (UL) transmission, at least after a duration of time from receiving the TCI state update, wherein the duration of time is determined based on the P BST values;

wherein:
- a TCI state refers to at least one source reference signal (RS) with a corresponding quasi co-location (QCL) type, and the QCL type is a type of a QCL property associated with the at least one source RS, and
- the beam refers to the QCL type being set to a spatial property used to receive or transmit the at least one source RS included in the TCI state update.

18. The method of claim 17, further comprising:
transmitting capability information including Z minimum BST values, wherein:
$Z \geq 1$; and
the P BST values are based on the Z minimum BST values.

19. The method of claim 18, wherein when Z=1, then the Z minimum BST values correspond to a single minimum BST value that is common for all of the P BST values, and each of the P BST values is equal to or greater than the single minimum BST value.

20. The method of claim 18, wherein when Z=P, then the Z minimum BST values correspond to a separate minimum BST value for each of the P BST values, and the each of the P BST values is equal to or greater than the respective separate minimum BST value.

* * * * *